(12) United States Patent
Gustman et al.

(10) Patent No.: US 6,574,638 B1
(45) Date of Patent: *Jun. 3, 2003

(54) METHOD AND APPARATUS FOR CATALOGUING MULTIMEDIA DATA USING SURVEYING DATA

(75) Inventors: Samuel Gustman, Santa Monica, CA (US); Barbara DeLury, Los Angeles, CA (US)

(73) Assignee: Survivors of the Shoah Visual History Foundation, Los Angeles, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 09/659,987

(22) Filed: Sep. 12, 2000

(51) Int. Cl.⁷ .............................. G06F 17/30
(52) U.S. Cl. .................. 707/104.1; 707/102; 707/10
(58) Field of Search .................. 707/10, 102, 103 R, 707/104.1

(56) References Cited

U.S. PATENT DOCUMENTS

| | | |
|---|---|---|
| 5,010,500 A | 4/1991 | Makkuni et al. |
| 5,119,474 A | 6/1992 | Beitel et al. |
| 5,121,470 A | 6/1992 | Trautman |
| 5,123,088 A | 6/1992 | Kasahara et al. |
| 5,192,999 A | 3/1993 | Graczyk et al. |
| 5,210,868 A | 5/1993 | Shimada et al. |
| 5,241,671 A | 8/1993 | Reed et al. |
| 5,274,758 A | 12/1993 | Beitel et al. |
| 5,278,946 A | 1/1994 | Shimada et al. |
| 5,280,573 A | 1/1994 | Kuga et al. |
| 5,283,638 A | 2/1994 | Engberg et al. |
| 5,283,819 A | 2/1994 | Glick et al. |
| 5,297,249 A | 3/1994 | Bernstein et al. |
| 5,303,296 A | 4/1994 | Zucker |
| 5,307,456 A | 4/1994 | Macay |
| 5,402,499 A | 3/1995 | Robinson et al. |
| 5,404,506 A | 4/1995 | Fujisawa et al. |
| 5,408,665 A | 4/1995 | Oren et al. |
| 5,414,644 A | 5/1995 | Seaman et al. |
| 5,428,730 A | 6/1995 | Baker et al. |
| 5,428,774 A | 6/1995 | Takahashi et al. |
| 5,434,592 A | 7/1995 | Dinwiddle, Jr. et al. |
| 5,436,898 A | 7/1995 | Bowen et al. |
| 5,450,581 A | 9/1995 | Bergen et al. |
| 5,461,611 A | 10/1995 | Drake, Jr. et al. |
| 5,493,677 A | 2/1996 | Balogh et al. |
| 5,515,490 A | 5/1996 | Buchanan et al. |
| 5,530,852 A | 6/1996 | Meske, Jr. et al. |
| 5,608,900 A | 3/1997 | Dockter et al. |
| 5,613,909 A | 3/1997 | Stelovsky |
| 5,615,112 A | 3/1997 | Liu Sheng et al. |
| 5,617,119 A | 4/1997 | Briggs et al. |
| 5,630,121 A | 5/1997 | Braden-Harder et al. |
| 5,630,125 A | 5/1997 | Zellweger |
| 5,649,185 A | 7/1997 | Antonogini et al. |

(List continued on next page.)

OTHER PUBLICATIONS

U.S. patent application Ser. No. 09/792,381, Gustman, filed Feb. 3, 2000.
U.S. patent application Ser. No. 09/788,310, Gustman, filed Feb. 16, 2001.
U.S. patent application Ser. No. 09/659,988, Gustman, filed Sep. 12, 2000.

*Primary Examiner*—Diane D. Mizrahi
(74) *Attorney, Agent, or Firm*—The Hecker Law Group

(57) ABSTRACT

A method and apparatus is described wherein survey data collected from different survey versions may be retained in a cohesive data, or knowledge, base that may be used to catalogue multimedia data. A survey schema is defined that comprises survey elements that may be used to define surveys and capture survey data. In one or more embodiments of the invention, survey data may be linked to a multimedia cataloguing system. The linked survey data may be used alone or in combination with the cataloguing system to retrieve multimedia data.

26 Claims, 22 Drawing Sheets

U.S. PATENT DOCUMENTS

| | | |
|---|---|---|
| 5,649,186 A | 7/1997 | Ferguson |
| 5,682,330 A | 10/1997 | Seaman et al. |
| 5,724,605 A | 3/1998 | Wissner |
| 5,813,014 A * | 9/1998 | Gustman .................... 707/103 |
| 5,832,495 A * | 11/1998 | Gustman .................... 707/102 |
| 5,832,499 A | 11/1998 | Gustman |
| 5,867,709 A | 2/1999 | Lang et al. |
| 6,092,080 A | 7/2000 | Gustman |
| 6,199,060 B1 | 3/2001 | Gustman |
| 6,212,527 B1 * | 4/2001 | Gustman .................... 707/102 |
| 6,353,831 B1 | 3/2002 | Gustman |

* cited by examiner

Sections...

▽ 1. PIQ Entry Details
▽ 2. Front Page
▽ 3. General Interview Detail
▽ 4. Interviewee Information
▽ 5. Prewar Life
  Prewar Addresses
  Household members (extended)
  Organizational Affiliation
  Activities & Interests
  *Attend synagogue or church*
▽ 6. Wartime
▽ 7. Postwar
▽ 8. Family / People in This
▽ 9. Family Identity
▽ 10. Post-Interviewer Information
▽ 11. Interviewer information
▽ 12. Notes
▽ 13. Rescue and Aid Insert
▽ 14. War Crime Insert
▽ 15. Liberation Insert Section
▽ xxx Non-Catalogueable PIQ
▽ Unused Questions...

Currently Selected Question Group....
*Attend synagogue or church*

| Answer Type | Question Text | Format | Keyword Group | Object Type | Don't Replicate |
|---|---|---|---|---|---|
| Boolean | Did your family attend a synagogue or church | Yes;No | | | Don't Repl |
| Plain Text | If so, how often? | | | | |
| Object | Name and Location of synagogue, church, e | | Religious Leaders | PIQ...Locatio | |
| Object | Name of synagogue or church leader? | | | PIQ...Person | |
| Single Select | Position Title? (Rabbi, priest, reverand, etc) | | | | |

[Add Question Group]
[Delete Question Group]
[Export]
[Merge]

[Add Section]
[Delete Section]
[Collapse All]

[Done]

Testimony IntCode : 232
Interviewee : Sigi Hart

Spreadsheet...    OK

Sections   Collapse All
Find | Reset

▷ 1. PIQ Entry Details
▷ 2. Front Page
▷ Survivor Release Enclosed
▷ 3. General Interview Details
  ▷ *Name of Interviewee*
      *Date of Pre-Interview & Interview*
      *Intr Location & Home Addr*
▷ 4. Interviewee Information
▷ 5. Prewar Life
      *Preware Addresses*
      *Household members (extended family & other*
      *Organizational Affilitaion*
      *Activities & Interests*
      *Attend synagogue or church*
▷ 6. Wartime
▷ 7. Postwar
▷ 8. Family / People in This Testimony
▷ 9. Family Identity
▷ 10. Post-Interviewer Information
▷ 11. Interviewer Information
▷ 12. Notes
▷ 13. Rescue and Aid Insert (name)
▷ 14. War Crime Trails
▷ 15. Liberation Insert Section
▷ xxx Non-Catalogueable PIQ Questions

Selected Question Group

*Name of Interviewee*

| Question | Answer |
|---|---|
| | |

Edit Alias to PIQPerson...

3. *General Interview Details: Release Name of Interviewee*
*(as appears on Release Form) (PIQAlias)*

Alias for :   Sigi Hart    — 802
    First   Sigi   ⎫
   Middle         ⎬ — 806
    Last   Hart   ⎭ — 804
    Title
Alias Type   release name — 808

Notes About
This Alias — 810

NOTE : 'Alias Type' is REQUIRED in order to save the record

Paste Name    Cancel    OK

| | | | |
|---|---|---|---|
| PIQPerson | friends | | , Simon , |
| PIQPerson | friends | | , [Diamond] , , Mr. |
| PIQPerson | sisters-in-law | | [Vogel], Michelle , |
| PIQPerson | aunts | | [Wulkan] , Freidel , |
| PIQPerson | grandfathers | | Begleiter , , |
| PIQPerson | grandmothers | | Begleiter , , |
| PIQPerson | aunts | | Begleiter , Adela , |
| PIQPerson | uncles | | Begleiter , Baruch , |
| PIQPerson | uncles | | Begleiter , Isak , |

Plain Text Answer

Keywords

PIQ Choices   Find | Again | Reset

Keyword

Aleksander Rebbes
Baal Koreh
Baal Tefilla
Belzer Rebbes
cantors
Hager, Rabbi Menahem Mendel Ben Hayyim
Halberstam, Rabbi Yekutiel Judah
Lubavitcher Rebbes
minister
occupations, gabbaim

FIGURE 11

Testimony IntCode : 232
Interviewee : Sigi Hart

Sections — Collapse All — Spreadsheet... — OK

Find | Reset

1. PIQ Entry Details
2. Front Page
3. General Interview Details
4. Interviewee Information
5. Prewar Life
   - Preware Addresses
   - Household members (extended family & other
   - Organizational Affilitaion
   - Activities & Interests
   - *Attend synagogue or church*
6. Wartime
7. Postwar
8. Family / People in This Testimony
9. Family Identity
10. Post-Interviewer Information
11. Interviewer IInformation
12. Notes
13. Rescue and Aid Insert (name)
14. War Crime Trials
15. Liberation Insert Section
xxx Non-Catalogueable PIQ Questions Selected Question Group

*Attend synagogue or church*

| Question | Answer 1 |
|---|---|
| Did your family attend a synagogue or church prior to the war? (Yes, No) | Yes |
| If so, how often? (Plain Text) | Friday and Saturday every week |
| Name and Location of synagogue, church, etc. (PIQLocation) | Place Nm: Heidereyter Shul / Berlin (Germany) / Germany / Heidereyter Gasse |
| Name of synagogue or church leader? (PIQPerson) | |

Keyword Answer — Plain Text Answer

Keywords

| PIQ Persons | Prop KWs | |
|---|---|---|
| Type | | |
| PIQPerson | friends | Simon , , |
| PIQPerson | friends | [Diamond] , , Mr. |
| PIQPerson | sisters-in-law | [Vogel], Michelle |
| PIQPerson | aunts | [Wulkan] , Freidel , |
| PIQPerson | grandfathers | Begleiter , , |
| PIQPerson | grandmothers | Begleiter , , |
| PIQPerson | aunts | Begleiter , Adela , |
| PIQPerson | uncles | Begleiter , Baruch , |
| PIQPerson | uncles | Begleiter , Isak , |

PIQ Choices — Find | Reset

Keyword

METHOD AND APPARATUS FOR CATALOGUING MULTIMEDIA DATA USING SURVEYING DATA

BACKGROUND OF THE INVENTION

1. Field of the Invention

This invention relates to the collection and entering of data associated with a survey or other data collection mechanism using a computer system and the use of the survey data in cataloguing multimedia data.

2. Background Art

Data is sought and collected from different sources and used to, for example, assist in making economic, marketing, etc. decisions. The collected data may be used to supplement historical information with personal experiences and to identify behavioral patterns. For example, the United States government collects census data from households that may be used by governmental entities and community organizations to allocate funds, develop social programs as well as by the business sector to locate factories, shopping centers, etc. Surveys may also be conducted by businesses to determine consumers' attitudes and behavior to assist in the research, development and marketing of products.

In a survey, data collection is typically conducted by posing a set of questions to a set of participants in person, over the phone or in writing, for example. The answers are typically recorded in written form and processed or analyzed in some manner. Existing techniques for analyzing data lack the ability to generate a cohesive data, or knowledge, base of responses across surveys which would facilitate data analysis. Further, existing systems do not provide the ability to relate a survey data base to a multimedia system.

Increasingly, computer systems are being used to present multimedia material. Such material is usually in the form of text, graphics, video, animation, and sound. Two or more of these data types are usually combined to form the multimedia data presented by the computer system. A computer system that is used to present multimedia material is called a multimedia system.

A cataloguing mechanism is useful to catalogue multimedia data in a multimedia system such that the multimedia data may be identified and retrieved by searching the catalogue. For example, it is beneficial to be able to associate descriptive information of a catalogue to segments of multimedia data. The descriptive information may be queried and used to identify relevant segments of multimedia data.

A problem exists in capturing descriptive information that may be used to catalogue multimedia data. One mechanism that has been used to collect information is a survey. It would be beneficial to be able to incorporate the results of a survey into a catalogue that may be used to search and retrieve multimedia data.

SUMMARY OF THE INVENTION

A method and apparatus is described wherein survey data collected from different survey versions may be retained in a cohesive data, or knowledge, base that may be used to catalogue multimedia data. A survey schema is defined that comprises survey elements that may be used to define surveys and capture survey data. In one or more embodiments of the invention, survey data comprising answers to survey questions is stored in one or more elements of the survey schema. Answer elements of the survey schema may be associated with one or more elements of a catalogue of multimedia data. The linked survey data may be used alone or in combination with the cataloguing system to retrieve multimedia data.

In addition to retaining survey answers, a survey schema comprises survey elements that may be used to build different forms or versions of a survey (a survey instance). Examples of elements of a survey schema used in embodiments of the invention include: section, question group, question, answer, data object, insert, choice group, choice item, for example. A section may be used to group question groups, inserts and sections. An insert may be used to capture repeatable data. A question group may be used to group questions. An answer is associated with each question and may also be associated with an insert. Any combination of questions may be used with any combination of data types for answers to the questions.

According to one or more embodiments of the invention, an answer value may be stored as an attribute of an answer element or as attribute (or attributes) of another element associated with an answer element (e.g., a data object or answertext element). Examples of answer and data object types include text, boolean, date, location, movement, person and keyword. New answer and data object types and data objects may be dynamically added to the survey schema. For example, currency and health types may be added to capture currency and health answers.

In one or more embodiments of the invention, survey data may be associated with elements of a multimedia data catalogue. In one or more embodiments of the invention, survey data comprising a survey, survey answers or both may be queried and the results of the query used to identify multimedia data. A survey schema comprises elements that may be used to build a survey (or surveys) and store answers to survey questions. Elements of the survey may be linked to elements of a multimedia catalogue that are associated with the multimedia data. Survey data may be queried to identify a catalogue element and the multimedia data associated with the catalogue element.

In one or more embodiments of the invention, a phrase element of the catalogue is associated with a multimedia data item and with other catalogue elements such as keywords and persons. In one or more embodiments of the invention, an answer and/or question stored in a survey schema may comprise, or otherwise be associated with, catalogue elements such as a keyword (or keywords) and/or a person (or persons). By identifying a catalogue element (or catalogue elements) in a query operation on an answer or question in a survey schema, it is possible to identify phrase elements. Thus, in one or more embodiments of the invention, an association is formed between survey data and multimedia data via one or more catalogue elements.

BRIEF DESCRIPTION OF THE DRAWINGS

FIG. 3 illustrates an example of a window in a graphical user interface used to modify instances of section that comprise a survey instance according to an embodiment of the invention.

FIG. 5 provides an example of a display that is used to edit an instance of question according to an embodiment of the invention.

FIGS. 7, 8 and 9 provide examples of a graphical user interface for entering object information such as person, alias and location objects according to an embodiment of the invention.

FIG. 11 provides an example of a graphical user interface illustrating a portion of a survey instance that may be used to capture data according to an embodiment of the invention.

DETAILED DESCRIPTION OF THE INVENTION

Figure 1A:
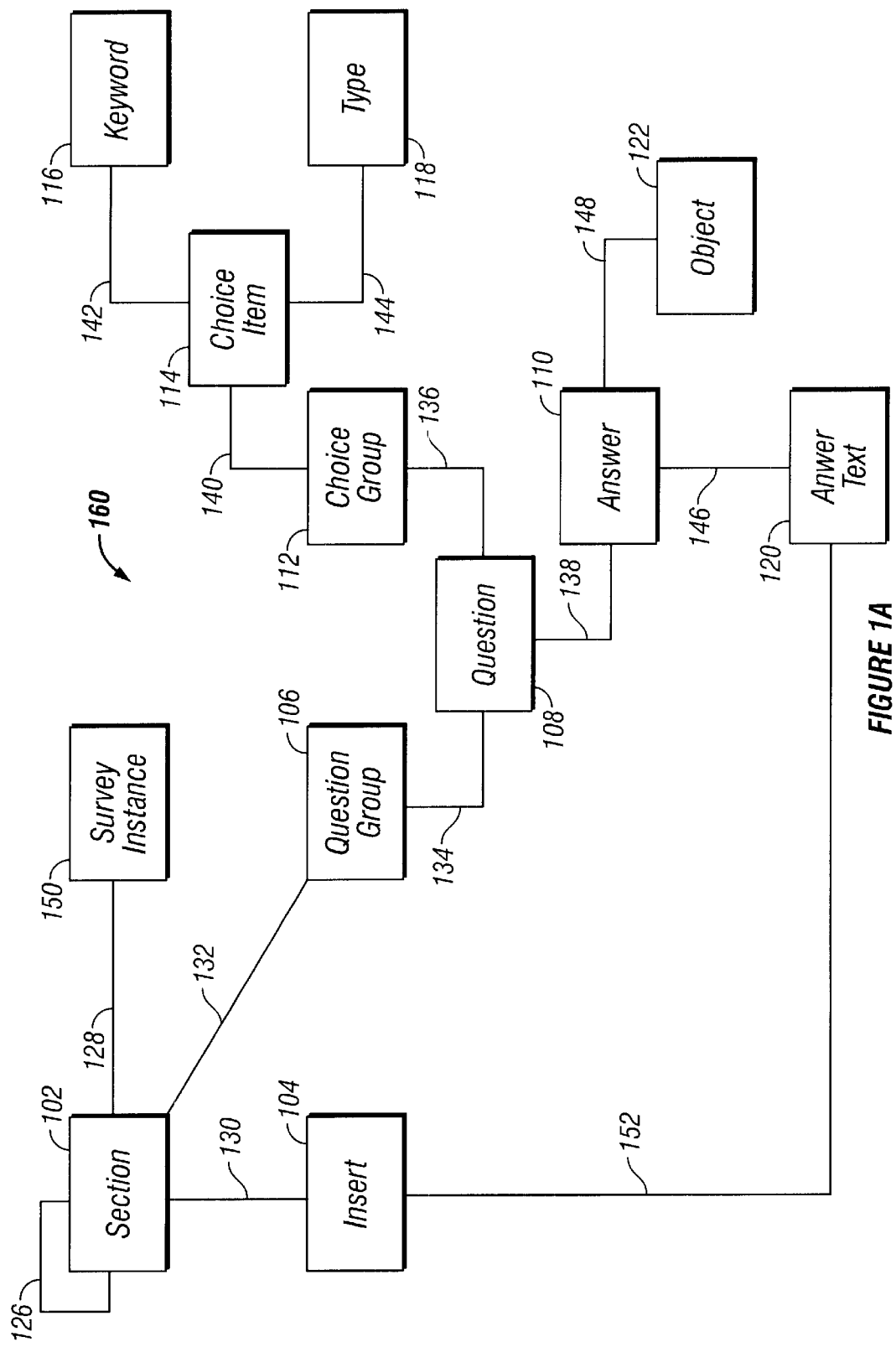
FIG. 1A illustrates a schema comprising survey elements according to an embodiment of the invention.

A method and apparatus for cataloguing multimedia data using surveying data is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In one or more embodiments of the invention, survey data comprising a survey, survey answers or both may be queried and the results of the query used to identify multimedia data. A survey schema comprises elements that may be used to build a survey (or surveys) and store answers to survey questions. Elements of the survey may be linked to elements of a multimedia catalogue that are associated with the multimedia data. Survey data may be queried to identify a catalogue element and the multimedia data associated with the catalogue element.

In one or more embodiments of the invention, a phrase element of the catalogue is associated with a multimedia data item and with other catalogue elements such as keywords and persons. In one or more embodiments of the invention, an answer and/or question stored in a survey schema may comprise, or otherwise be associated with, catalogue elements such as a keyword(s), phrase(s), segment(s), type(s) and/or a person(s).

By identifying a catalogue element (or catalogue elements) in a query operation on survey data (e.g., an answer or question), it is possible to identify phrase elements that are associated with the catalogue element. In one or more embodiments of the invention, the multimedia data is associated with the survey answer or question via the phrase element and its associated keywords and persons. That is, by identifying a keyword (or person) catalogue element that is associated with a phrase element and an answer (or question) survey element, it is possible to associate multimedia data to survey data and vice versa. Thus, in one or more embodiments of the invention, an association is formed between survey data and multimedia data via one or more catalogue elements.

Survey data may be linked using catalogue elements in addition to, or in replacement of, phrase, keyword or person catalogue elements. In one embodiment of the invention, a survey element may be associated with a segment element of the catalogue that is comprised of phrase elements each of which is associated with multimedia data.

For example, a testimony segment comprises multimedia data associated with a videotaped testimony, or interview, in which survey questions are presented and answered by a survey participant. Survey elements may include a testimony identifier that may be used to identify the testimony segment. The phrase elements associated with a testimony segment as well as the multimedia data associated with the phrase elements may be determined from the testimony segment.

Figure 13:
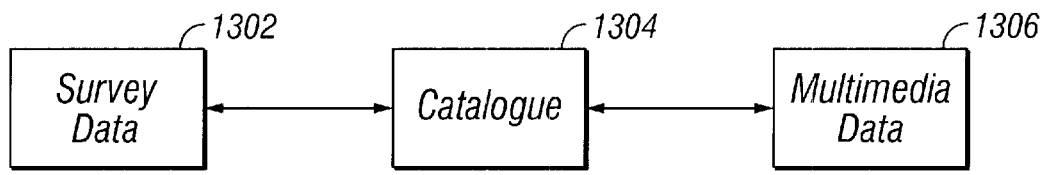
FIGS. 13–15 provide an overview of associations between survey and multimedia data according to one or more embodiments of the invention.
Figure 14:
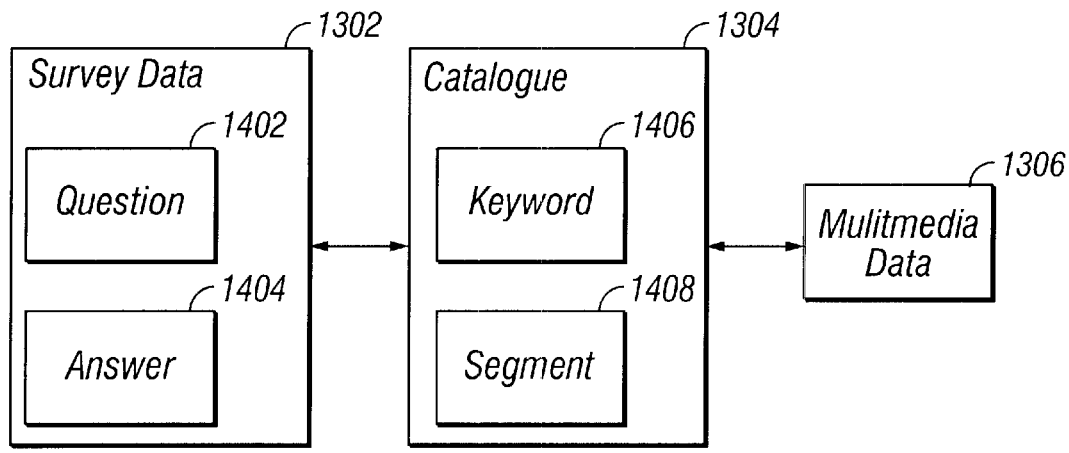
Figure 15:
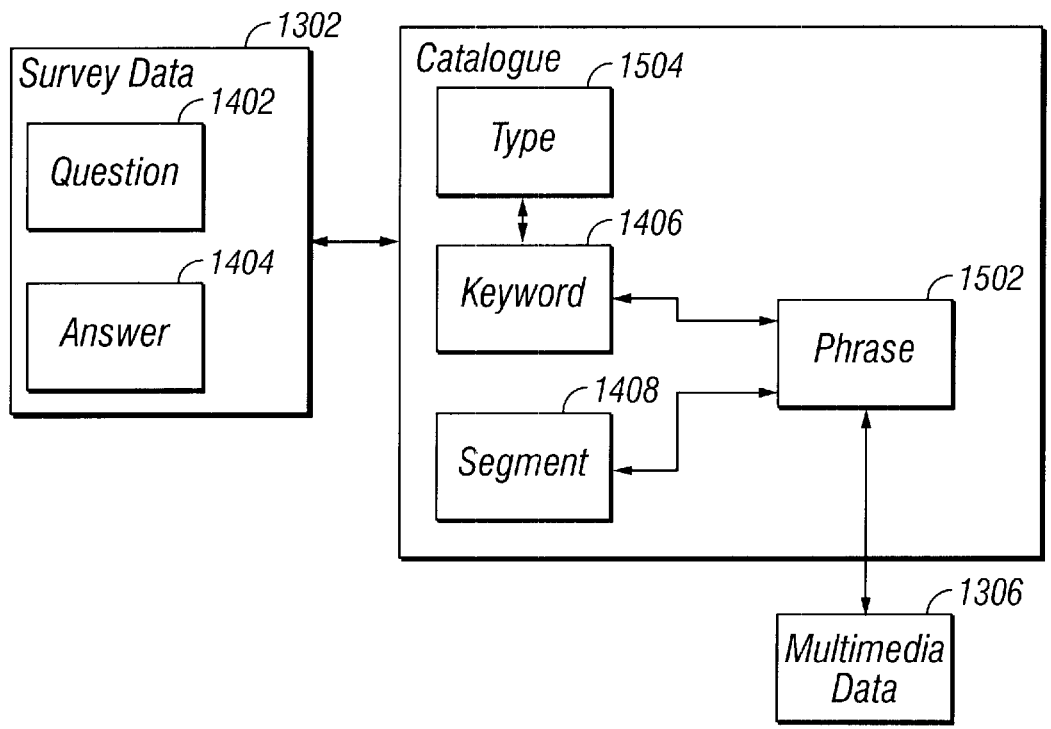

FIGS. 13–15 provide an overview of an association between survey and multimedia data according to one or more embodiments of the invention. Survey data 1302 comprises elements that are associated with a catalogue 1304. Catalogue 1304 comprises that are related to multimedia data 1306.

In one embodiment of the invention, a cataloguing graphical user interface is used to create instances of elements of catalogue 1304 wherein multimedia data is viewed and information descriptive of the multimedia data is stored in elements of the catalogue 1304. In another embodiment of the invention, a surveying system is used to enter survey data (e.g., survey responses) which may be used to populate attributes of elements of catalogue 1304.

In one embodiments of the invention, survey data 1302 comprises elements, such as question 1402 and answer 1404 of FIG. 14, having some number of attributes. Catalogue 1304 comprises keyword 1406 and segment 1408 elements. As is described in more detail below, segment 1408 and keyword 1406 are related to multimedia data 1306 such that an identification of either an instance of keyword 1406, an instance of segment 1408 or both may be used to identify multimedia data 1306.

In an embodiment of the invention, instances of keyword 1406 may be related to instances of question 1402 and answer 1404. For example, it is possible to define one or more instances of keyword 1406 as selectable as an answer to a survey question. An instance of answer 1404 may comprise an attribute (or attributes) that identifies one or more instances of keyword 1406.

Elements of survey data 1302 may comprise one or more attributes that identify instances of segment 1408. For example, in an embodiment of the invention, answer 1404 comprises a "testimonyid" attribute that may be used to identify an instance of segment 1408. That is, an attribute of answer 1404 may be used to store a value that identifies an instance of segment 1408.

Referring to FIG. 15, keyword 1406 and segment 1408 are associated with phrase 1502 in one or more embodiments of the invention. Phrase 1502 is associated with multimedia data 1306, or a portion thereof. It is possible using an association between phrase 1502 and either keyword 1406 or segment 1408 (or both) to identify an associated portion of multimedia data 1306. As is discussed in more detail below, phrase 1502 contains at least one attribute that may be used to identify multimedia data 1306, or a portion thereof. Elements of survey data 1302 and catalogue 1304 that are in some manner associated with phrase 1502 may be queried to identify instances of phrase 1502 and the multimedia data 1306 related to phrase 1502.

Figure 16:
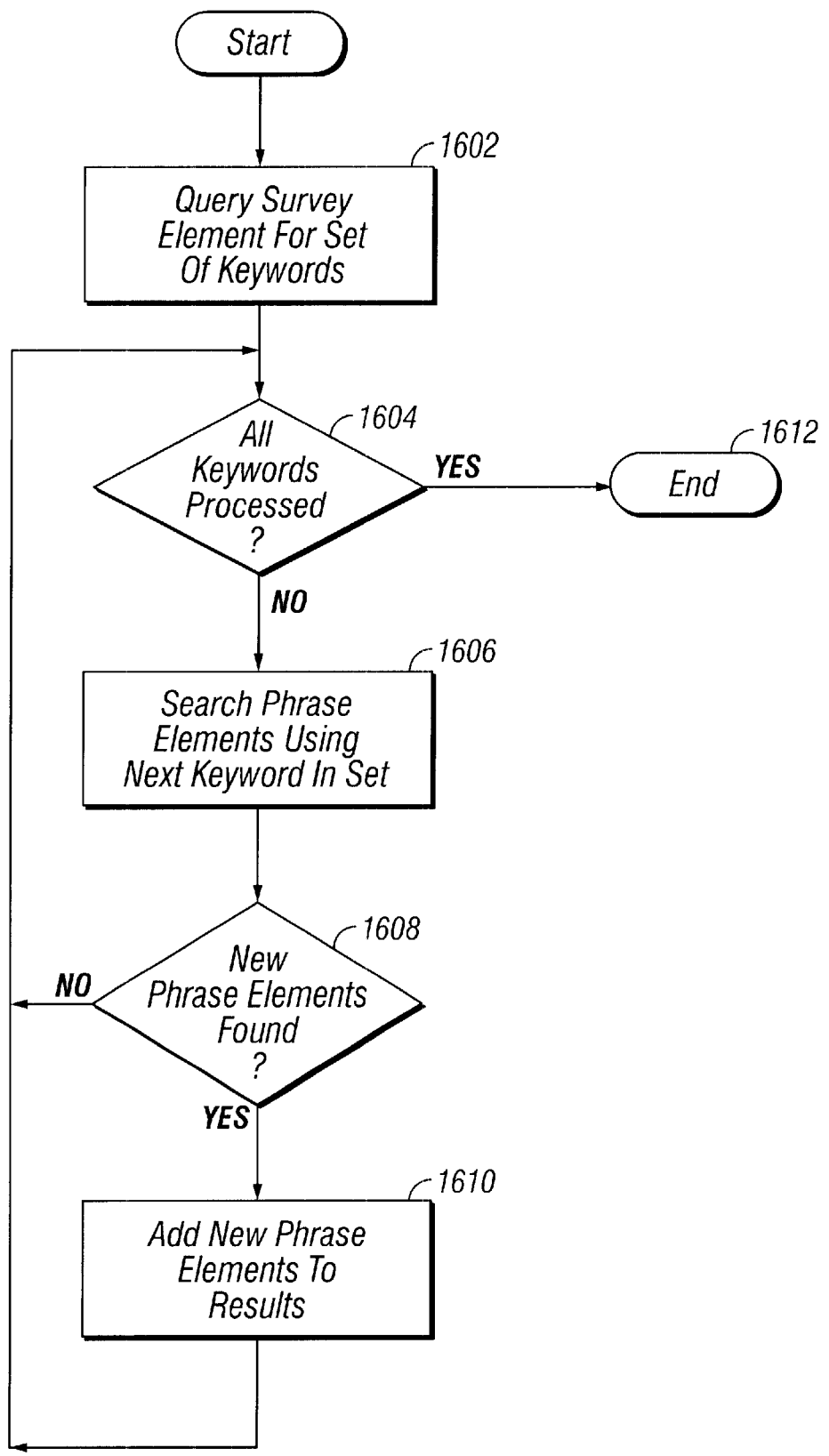
FIGS. 16–18 illustrate process flows for identification of catalogue elements, such as phrase, related to survey elements.
Figure 17:
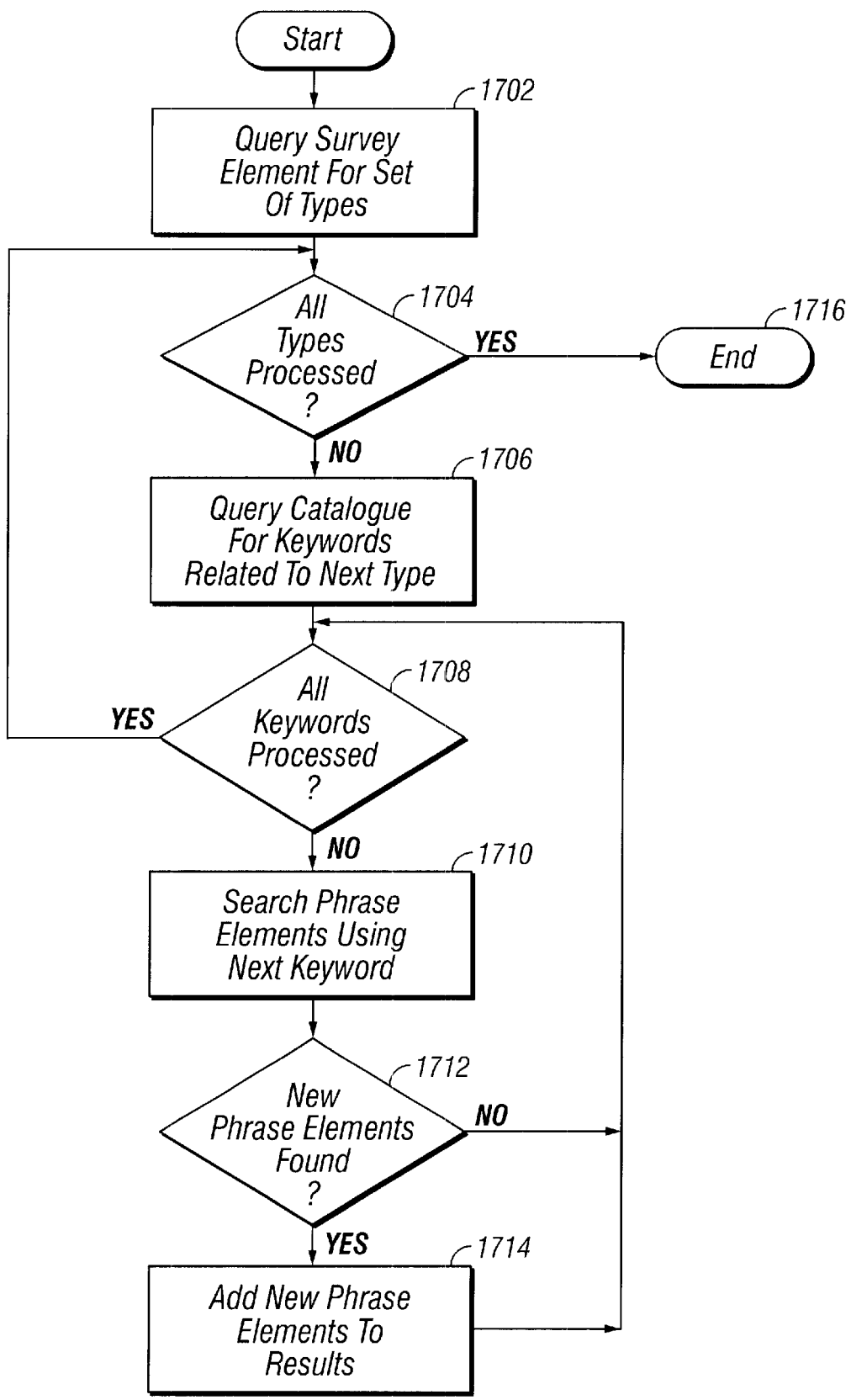
Figure 18:
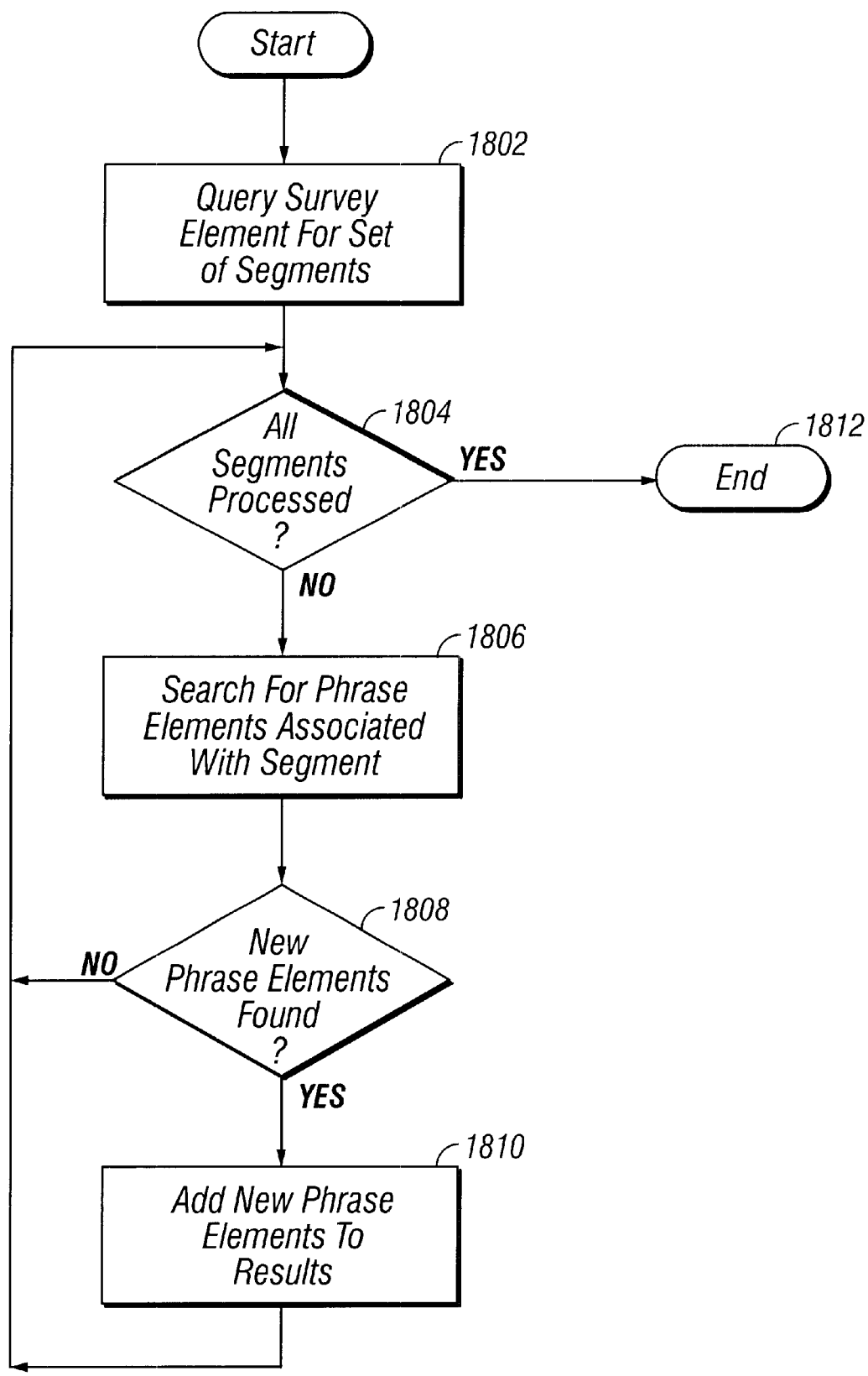

For example, by identifying an instance of question 1402 or answer 1404 that is associated with one or more instances of keyword 1406 or segment 1408, it is possible to identify instances of phrase 1502 and the multimedia data 1306 that is associated with the instances of phrase 15002. In one or more embodiments of the invention, question 1402 and answer 1404 may be associated with a type hierarchy that may be used to classify instances of keyword 1406. It is possible to identify instances of phrase 1502 using type 1504 and the association between type 1504 and keyword 1406. FIGS. 16–18 illustrate process flows for identification of catalogue elements, such as phrase 1502, related to survey elements.

FIG. 16 illustrates a process flow for identification of instances of phrase 1502 using instances of keyword 1406. Keyword 1406 may be associated with question 1402 and answer 1404 of survey data 1302, for example. At step 1602, a set of keywords 1406 is identified from elements of survey data 1302.

For example, a question 1302 may be queried to identify keywords 1406 that are associated with question 1302, The results of the query may be used in conjunction with the process of FIG. 16 to identify multimedia data 1306 that may be displayed when question 1302 is presented in a survey to a survey participant, for example. To further illustrate, a query of instances of answer 1404 may yield a set of answers 1404 wherein an answer includes one or more instances of keyword 1406. The results of the query may be used in conjunction with the process of FIG. 16 to identify multimedia data that may be displayed as part of an answer to a survey question, for example.

At step 1604, a determination is made whether all of the keywords identified in step 1602 have been processed. If so, processing ends at step 1612. If not, processing continues at step 1606 to search catalogue 1304 for instances of phrase 1502 associated with the next keyword in the set created in step 1602.

At step 1608, a determination is made whether new instances of phrase 1608 where found in step 1606 (i.e., instances of phrase 1502 that were not found in a previous execution of step 1606). If not, processing continues at step 1604 to process any remaining keywords. If there are new instances of phrase 1502, processing continues at step 1610 to add the new instances to a result comprising instances of phrase 1502, and processing continues at step 1604 to process any remaining keywords. The result comprises instances of phrase 1502 related to the survey element (or elements) related to instances of keyword 1406 identified in step 1602. The multimedia data 1306 related to the instances of phrase 1502 in the result may be identified using the instances of phrase 1502.

Type 1504 may be associated with elements of survey data 1302 and keyword 1406 and thus may be used to identify a set of related multimedia data 1306. FIG. 17 illustrates a process flow for retrieval of instances of phrase 1502 using instances of type 1504. Type 1504 may be associated with elements of survey data 1302. At step 1702, a set of types is identified that comprises instances of type 1504 that are related to one or more elements of survey data 1302 (e.g., to an instance (or instances) of question 1402 or answer 1404, or both).

At step 1704, a determination is made whether all of the types identified in step 1702 have been processed. If so, processing ends at step 1716. If not, processing continues at step 1706 to search catalogue 1304 for instances of keyword 1406 that are related to the next instance of type 1504 in the set. At step 1708, a determination is made whether all of the keywords identified in step 1706 have been processed. If so, processing continues at step 1704 to process any remaining types. If not, processing continues at step 1710 to search catalogue 1305 for instances of phrase 1502 associated with the next keyword in the set created in step 1706.

At step 1712, a determination is made whether new instances of phrase 1502 where found in step 1710 (i.e., instances of phrase 15002 that were not found in a previous execution of step 1710). If not, processing continues at step 1708 to process any remaining keywords. If there are new instances of keyword 1406, processing continues at step 1714 to add the new instances to a result comprising instances of phrase 1502, and processing continues at step 1708 to process any remaining keywords. The result comprises instances of phrase 1502 related to the survey element (or elements) related to instances of type 1504 identified in step 1702. The multimedia data 1306 related to the instances of phrase 1502 in the result may be identified using the instances of phrase 1502.

Elements of survey data 1302 may be related to an instance (or instances) of segment 1408. Using a relationship between segment 1408 and phrase 1502, it is possible to identify the multimedia data 1306 that is associated with an element of survey data 1302 that is related to segment 1408. FIG. 18 illustrates a process flow for identification of instances of phrase 1502 using instances of segment 1408.

At step 1802, a set of segments is identified that comprises instances of segment 1408 that are related to one or more elements of survey data 1302 (e.g., to an instance (or instances) of answer 1404, a data object, or both).

At step 1804, a determination is made whether all of the segments identified in step 1802 have been processed. If so, processing ends at step 1812. If not, processing continues at step 1806 to search catalogue 1304 for instances of phrase 1502 that are related to the next instance of segment 1408 in the set.

At step 1808, a determination is made whether new instances of phrase 1608 were found in step 1806 (i.e., instances of phrase 1502 that were not found in a previous execution of step 1806). If not, processing continues at step 1804 to process any remaining segments. If there are new instances of segment 1408, processing continues at step 1810 to add the new instances to a result which comprises instances of phrase 1502, and processing continues at step 1804 to process any remaining segments. The result comprises instances of phrase 1502 related to the survey element (or elements) via instances of segment 1408 identified in step 1806. The multimedia data 1306 related to the instances of phrase 1502 in the result may be identified using the instances of phrase 1502.

FIGS. 16–18 are discussed with reference to the question 1402 and answer 1404 elements of survey data 1302. It should be apparent that other elements of survey data 1302 may be used as well. For example, in one or more embodiments of the invention, survey data 1302 comprises data objects that may be used to store an answer to a survey question. Examples of data objects include person, alias, and location. It is possible to search survey data using one or more data objects as.well as other elements of survey data 1302. Similarly, other catalogue elements may be related to survey data or used to identify multimedia data.

Survey Data

In one or more embodiments of the invention, survey data comprises a survey schema that comprises survey elements that may be used to define surveys and capture survey data. In one or more embodiments of the invention, survey data comprising answers to survey questions is stored in one or more elements of the survey schema. Answer elements of the survey schema may be associated with one or more elements of a catalogue that may be used as indices into multimedia data. In one or more embodiments of the invention, a catalogue comprises keywords organized in a hierarchy and categorized according to a type hierarchy, phrases and segments, for example.

Survey data may be collected from different survey versions into a cohesive data, or knowledge, base or other storage mechanism. Each survey version may comprise different sets of questions and different types of answers to the questions. In an embodiment of the invention, at least one relational database may be used to store survey schema, survey instances and participant data. However, it should be apparent that other storage mechanisms (e.g., file system) may be used. Data may be collected and retained in a cohesive store for each participant regardless of the survey form or instance used.

A survey schema comprises survey elements that may be used to build different forms or versions of a survey (a survey instance). Examples of elements of a survey schema used in embodiments of the invention include: section, question group, question, answer, data object, insert, choice group, choice item, for example. A survey instance may be defined using elements of a survey schema. For example, a survey instance may comprise some number of sections each of which may comprise some number of sections (or subsections), inserts and question groups. A question group may comprise questions. An answer is associated with each question and may also be associated with an insert. Any combination of questions may be used with any combination of data types for answers to the questions. An existing survey instance may be dynamically modified by adding, deleting or modifying survey elements.

In one or more embodiments of the invention, the schema includes a question element that is used to define survey questions. Questions may be grouped using a question group element. Questions and answer types may be dynamically added to the survey schema and added to a survey instance created using the survey schema. An association is created between a question and an answer via the question and answer elements.

According to one or more embodiments of the invention, a survey schema includes an answer element that identifies a data type that may be a simple or complex data type. A simple data type typically involves a single value while a complex data type may involve multiple values. In one or more embodiments of the invention, simple data is stored in an attribute of an instance of answer or another element associated with the answer instance (e.g., answertext). Complex data is stored in more than one attribute such as in attributes of a data object that is related (directly or indirectly) to an answer element. Thus, an answer value may be stored as an attribute of an answer element or as attribute (or attributes) of another element associated with an answer element (e.g., a data object or answertext element). Examples of answer and data object types include text, boolean, date, location, movement, person and keyword. New answer and data object types and data objects may be dynamically added to the survey schema.

Survey answers that are retained in the survey data base ( e.g., in answer, answertext and data object elements) may comprise links to elements of a catalogue that is associated with multimedia data. For example, an answer to a survey question may comprise one or more keywords that are components of a catalogue into the multimedia data.

A special type of survey element referred to as an insert may be repeated none or more times in a survey. An insert may be used, for example, to accommodate repeatable survey information. For example, a survey may include questions requesting a person's educational background (e.g., undergraduate and graduate collegial background). An insert may be used to capture each collegial experience, for example.

Question group elements are reusable in a survey such that more than one instance of a question in a question group may share the same identifier. Thus, it is possible to correlate answers to question instances using the same identifier.

Survey Schema

According to one or more embodiments of the invention, a schema is defined that identifies a generic survey structure and includes survey elements that may be used to create survey instances and capture data collected for each survey instance. FIG. 1A illustrates a schema comprising survey elements according to an embodiment of the invention.

In one or more embodiments of the invention, a survey instance (or survey form) 150, created using a schema such as survey schema 160, comprises one or more instances of section 102. Section 102 may include a number of instances of section 102 (or subsections), insert 104 or question group 106. Insert 104 represents an element that may be repeated in survey instance 150. Insert 104 may be used to dynamically add components to a survey instance 150 to capture repeatable data which may occur when there can be multiple answers to a question or questions, for example. A section may contain questions requesting information regarding the automobiles that a participant's has purchased. An insert may be used to group answers associated with each of the automobiles.

A subsection is an instance of section 102 that is contained within another instance of section 102. In one or more embodiments of the invention, there may be a hierarchy of instances of section 102 defined in survey schema 160 and/or used in a survey instance 150.

An instance of section 102 is related to another instance of section 102 via relationship 126 such that an instance of section 102 may contain (or be contained in) multiple instances of section 102. Insert 104 is related to section 102 via relationship 130 such that multiple instances of insert 104 may be associated with section 102. Section 102 may contain none or more instances of insert 104. Section 102 may be associated with, and contain, none or more instances of question group 106 as is illustrated by relationship 132.

Question group 106 may be used to group a number of instances of question 108. Question group 106 may contain more than one question 108. Question 108 may be included in more than one question group 106.

In one or more embodiments of the invention, a set of selection items (each identifying a valid answer selection) may be associated with a question. A selection is identified by a choice item 114. Choice group 112 is used to group a number of instances of choice item 114 to an instance of question 108. Where a choice group 112 is associated with question 108, a value of answer 110 may be identified by selecting one of a number of choices identified by instances of choice item 114 comprising choice group 112.

In one or more embodiments of the invention, choice item 114 may be one selection item, or value. For example, an instance of choice item 114 may specify an instance of keyword 110 (i.e., an attribute value associated with keyword 110). Alternatively, choice item 114 may identify a class that comprises a plurality of selection items. For example, choice item 114 may identify an instance of type 118, where type 118 represents a class of selection items (e.g., a class of keywords). A class of selection items comprises selection items (e.g., instances of keyword 116) that are of type 118. Thus, choice group 112 may comprise instances of choice item 114 which may be a combination of none or more individual selection items and none or more classes of selection items.

An answer may be a simple or complex answer. A simple data type typically involves a single value while a complex data type may involve multiple values. In one or more embodiments of the invention, simple data is stored in an attribute of an instance of answer or another element associated with the answer instance (e.g., answertext). Complex data is stored in more than one attribute such as in attributes of a data object that is related (directly or indirectly) to an answer element.

In one or more embodiments of the invention, an answer to an instance of question 108 may be stored in answer 110, answerText 120 and/or data object 122. A single-value answer may be stored in an attribute of answer 110 (e.g., a value stored in attribute 266, "answertext" of FIGS. 2A–2C). None or more instances of answertext 120 may be used to store additional answer text of a question 108. In an embodiment of the invention, a survey element referred to as data object 122 may be used to store a multi-value answer. In an embodiment of the invention, multiple instances of data object 122 may be used to store a multi-value answer to question 108. An attribute of one data object 122 may be stored as attributes of data object 122. Thus, an instance of data object 122 may be associated with another instance of data object 122 and answer 110, for example.

In an embodiment of the invention, data object 122 includes, but is not limited to, person, alias, date, movements and location objects each of which comprise a set of attributes that may be used to store values of a multi-value answer. A person data object may have first name, middle name, last name, date of birth, gender, type, title, etc. attributes, for example. Embodiments of the invention may include additional or different data objects 122 or have additional or different attributes.

Survey schema 160 is used to create none or more survey instances 150. Survey instance 150 may be in a print, electronic or other form, for example. In one or more embodiments of the invention, survey instance 150 may be displayed in a graphical user interface (GUI) which may be used to capture survey data. The GUI may be used by a survey participant to enter answers, or by another party who enters a participant's answers recorded on a hardcopy of a survey instance 150, for example.

In one or more embodiments of the invention, a survey instance 150 that is displayed in a GUI or otherwise may comprise some number (i.e., none or more) of instances of elements of survey schema 160. FIG. 1C provides an example of structure of a survey instance according to an embodiment of the invention. Survey instance 150 comprises some number of section 102, question group 106, question 108, choice group 112, choice item 114, etc. Question 108 identifies an answer 110 that is to be used in capturing an answer (or answers) to the question. Answer 110 may identify a data object, or other schema element, that may be used in storing answer values. Instances of answer 110, answer text 120 and object 122 may be added to a survey instance 150 to store answers to a question 108. Insert 104 may be associated with instances of section 102 and instances of insert 104 may be dynamically added during data capture to capture repeatable data, and answer 110 may be associated with an insert 104.

Survey schema 160 may be used to create any number of survey instance 150 each of which may vary in their structure including but not limited to section 102, question group 106, question 108, answer 110 and/or the types of answers that are expected for each question. Answers associated with each of survey instance 150 may be captured into a cohesive data store (e.g., a relational database or databases).

Survey Schema Element Attributes

Figure 2A:
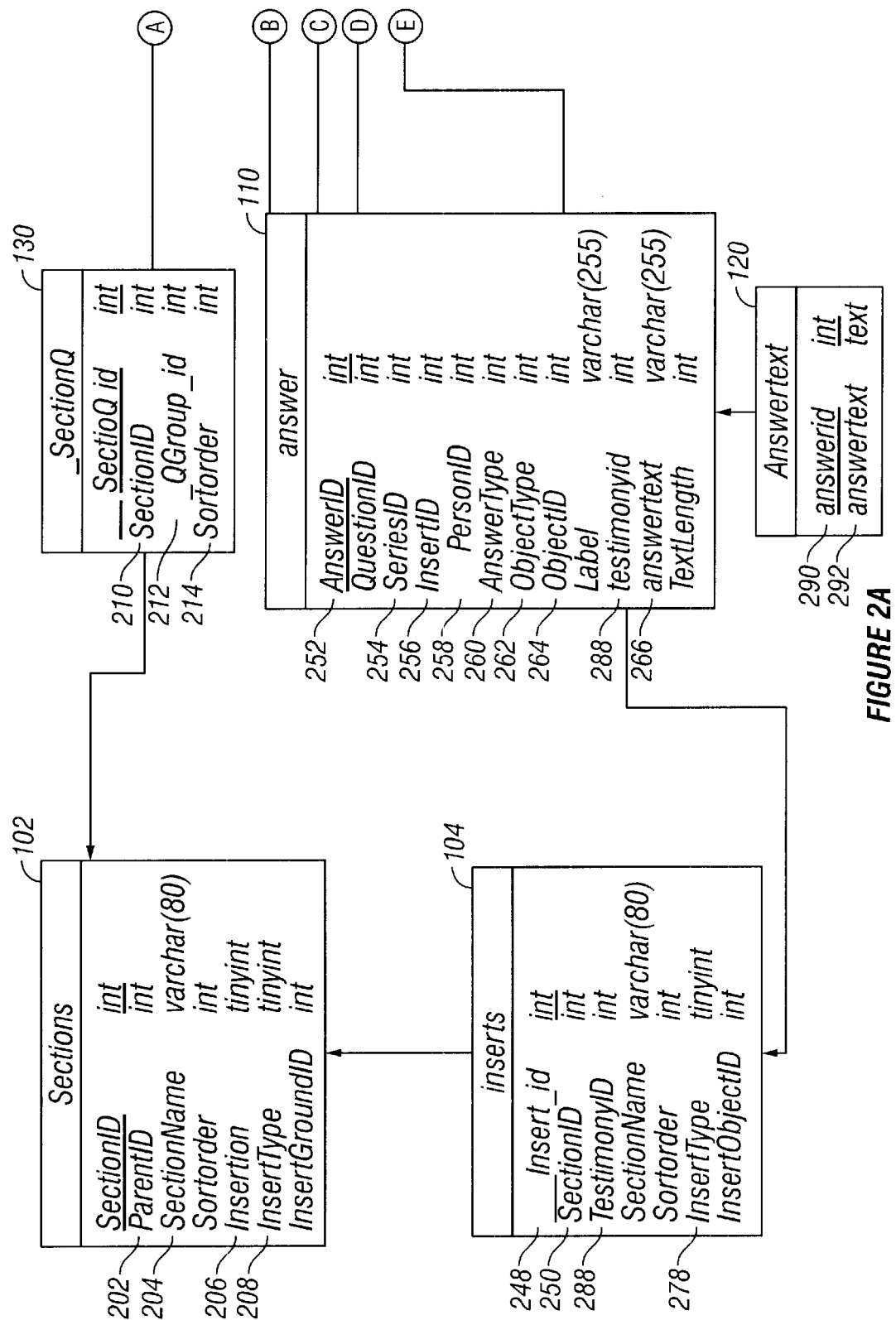
FIGS. 2A to 2C illustrate elements of the survey schema of FIG. 1A and attributes associated with survey elements according to one or more embodiments of the invention.
Figure 2B:
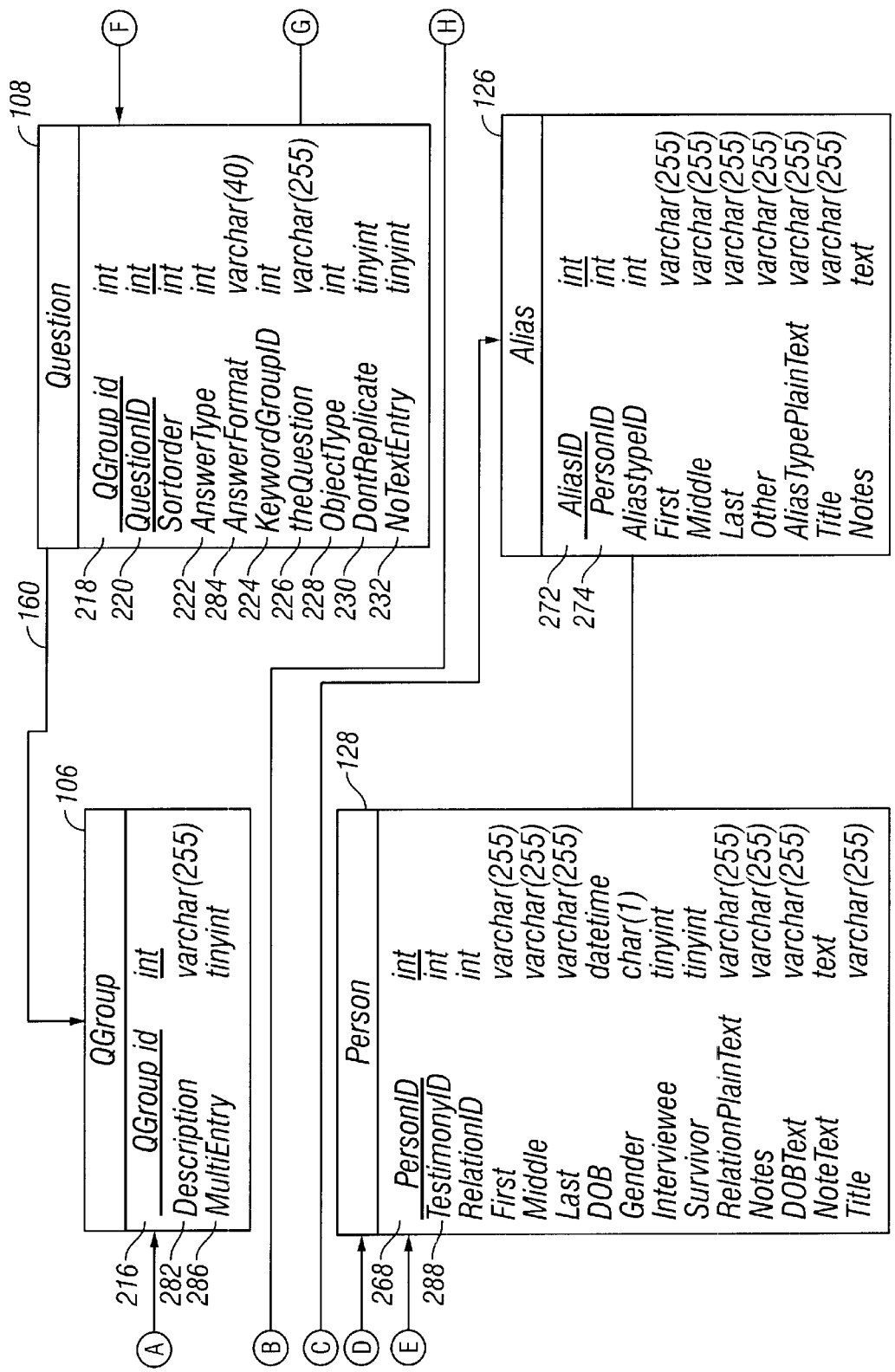
Figure 2C:
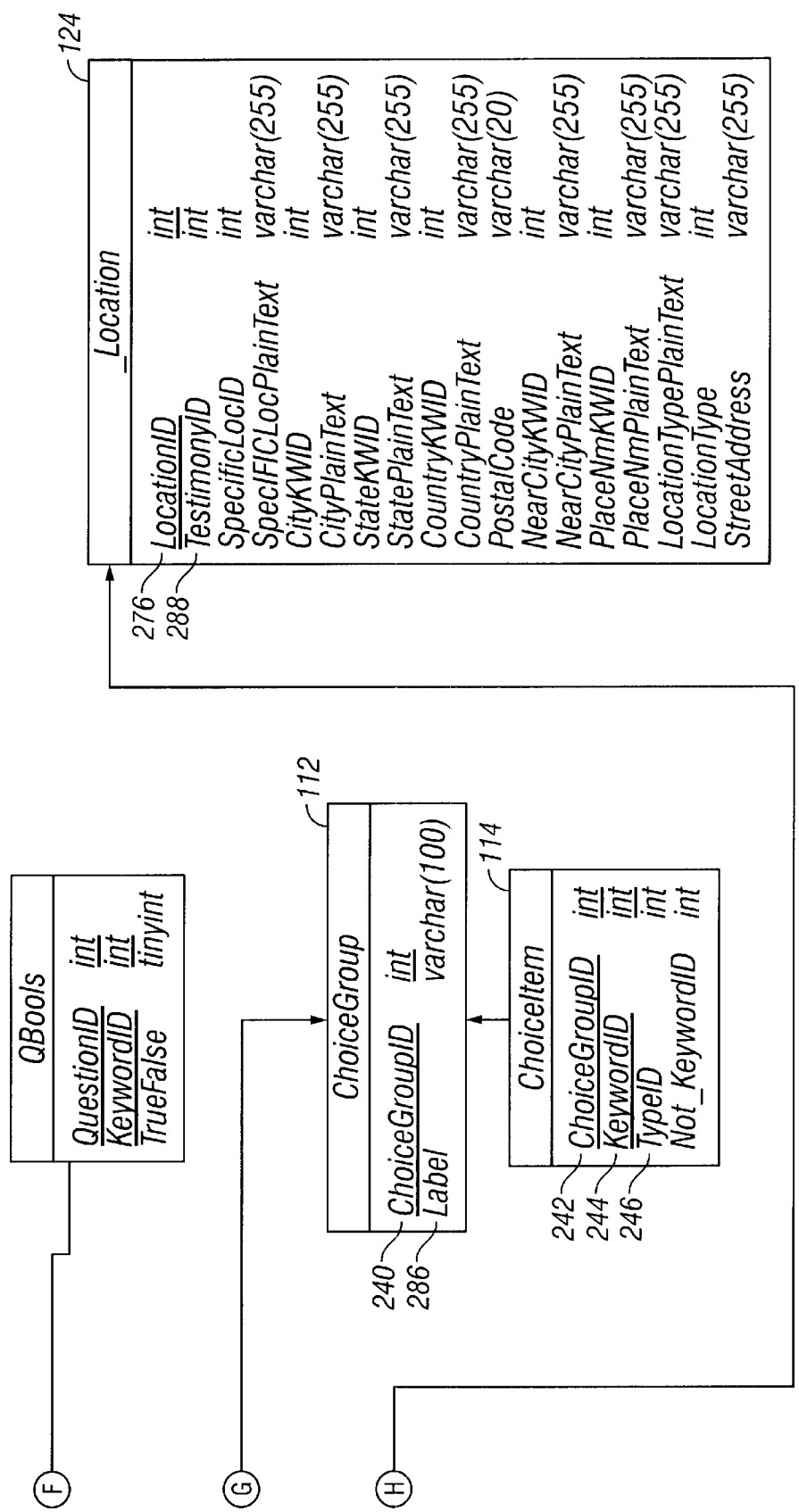

In one or more embodiments of the invention, attributes of elements of survey schema 160 comprise attributes that may be used to store information concerning components of a survey instance 150 and data collected for a survey instance 150 (e.g., participant data). FIGS. 2A to 2C illustrate elements of survey schema 160 of FIG. 1A and attributes associated with survey elements according to one or more embodiments of the invention.

Section 102 includes a section identifier attribute 202 ("SectionID") that uniquely identifies each instance of section 102. A parent identifier attribute 204 ("ParentID") identifies a subsection's parent instance of section 102. Attributes 206 and 208 indicate whether an instance of section 102 may have inserts (e.g., instances of insert 104) and the type of insert(s), respectively. Section name attribute 280 ("SectionName") comprises a name or title of an instance of section 102.

In one or more embodiments of the invention, element 130 of survey schema 160 is used to relate section 102 and question group 106 in a many-to-many relationship. That is, section 102 may include none or more instances of question group 106, and none or more instances of section 102 may contain the same instance of question group 106. Instances of element 130 may be identified using attribute 210 ("SectionQ_id"). Attributes 212 and 214 relate an instance of section 102 using its identifier (section identifier 150) and an instance of question group 106 using its identifier (question group identifier 216, "QGroup_id"), respectively. Question 108 includes a question identifier 220 ("QuestionID") to identify each instance. Attribute 218 associates an instance of question 108 with an instance of question group 106. Answer type attribute 222 identifies an answer type for question 108. Where the type of answer is a complex data object, attribute 228 identifies the type of data object (e.g., person 128, location 124 and alias 126).

Attribute 226 contains the text of the question. Attribute 230 identifies whether an answer 110 associated with an instance of question 108 is repeatable.

Choice group 112 includes a choice group identifier 240 ("ChoiceGroupID") that identifies an instance. Choice group identifier 240 is used in choice item 114 (attribute 242) to associate an instance of choice group 112 with an instance of choice item 114. Attributes 244 and 246 of choice item 114 to identify one selection item or a class of selection items, respectively.

Insert 104 includes an identifier attribute 248 ("Insert_id") that identifies an instance. Insert 104 is used to identify a repeatable data in a survey instance 150. Attribute 250 ("SectionID") associates an instance of insert 104 to an instance of section 102. Attribute 278 ("InsertType") identifies a type of insert.

An instance of answer 110 may be identified using attribute 252 ("AnswerID"). Attribute 254 ("QuestionID") associates an instance of answer 110 and an instance of question 108. An instance of answer 110 may be associated with an instance of insert 104 via attribute 256 ("InsertID"). A value that is an answer to a question may be stored in attribute 266 ("answertext"). Additional answer values may be stored in attribute 292 ("answertext") of element 120 which may be associated with answer 110 using attribute 290. Alternatively, a data object may be used to store a multi-value answer. Attributes 262 and 264 may be used to associate an answer 110 with a data object 122. Attribute 260 ("AnswerType") specifies the type of answer. Examples of answer types include boolean, plain text, object (e.g., data object) and single select. Person 128, alias 126 and location 124 are examples of data object 122. Person 128 includes attributes associated with a person (e.g., name, gender, date of birth, etc.) Attribute 268 ("PersonID") is used to identify an instance of person 128. A new answer type may be added by specifying a new value for attribute 260 associated with the new answer, or data, type.

Another example of data object 122, alias 126 may be used to store another identity associated with, for example, a person. Attribute 272 ("AliasID") is used to identify an instance of alias 126. Attribute 274 relates an instance of person 128 and alias 126. Location 124 includes attributes for storing location information (e.g., city, state, country, street address, etc.). Attribute 276 is used to identify an instance of location 124.

In one embodiment of the invention, for example, multiple instances of question 108 may be created with the same identifier. None or more instances of answer 110 relate to one instance of question 108. Alternatively, more than one instance of question 108 having the same identifier may be associated with none or more instances of answer 110. That is, a survey element such as question 108 may be reused such that multiple instances of question 108 are given the same identifier. Thus, the same identifier may be used to identify one or more instances of the element thus facilitating a query for information associated with the reusable element.

For example, all instances of answer 110 related to an instance (or instances) of question 108 may be retrieved by querying for one value of attribute 220 (i.e., "QuestionID"). Question group 106 further includes attribute 286 which indicates whether question group 106 is reusable. In a reusable question group 106, instances of the same question 108 are given the same identifier across instances of question group 106.

Figure 1B:
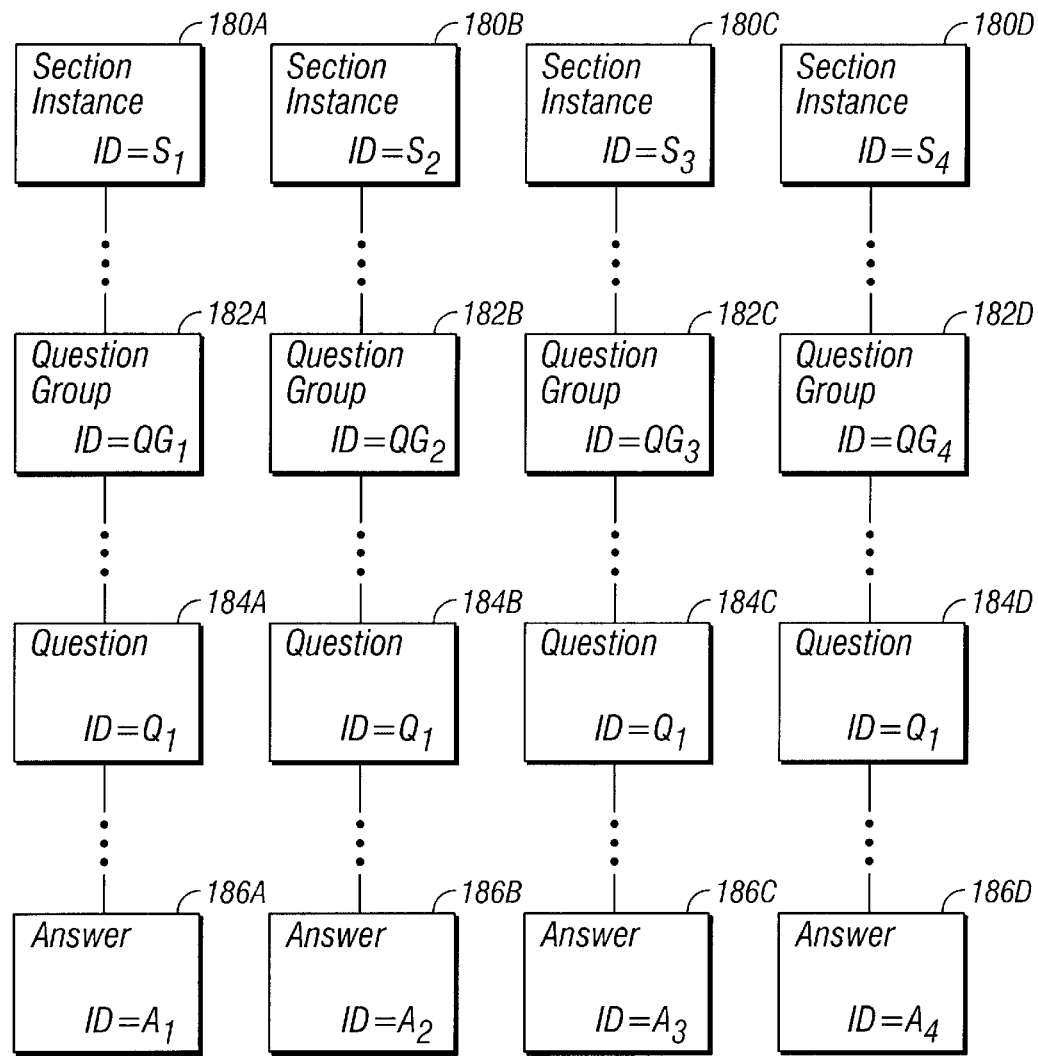
FIG. 1B provides an example of reusable survey elements according to an embodiment of the invention.
Figure 1C:
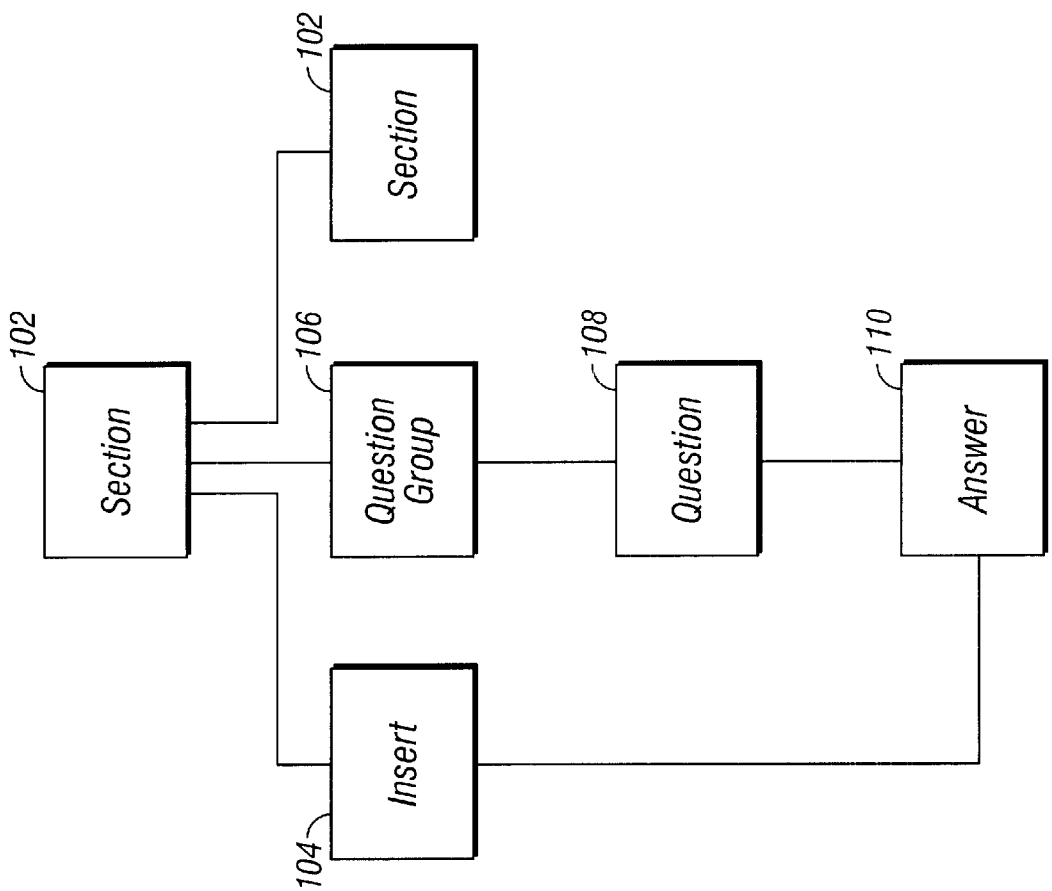
FIG. 1C provides an example of a structure of a survey instance according to an embodiment of the invention.

FIG. 1B provides an example of a question 108 in a reusable question group 106 according to an embodiment of the invention. Section instances 180A–180D are generated using section 102 of survey schema 160. In each of section instances 180A–180D, Attribute 202 is populated with a value that may be used to identify the instance. For example, section instances 180A–180D have identifiers of "$S_1$," "$S_2$," "$S_3$," and "$S_4$," respectively. Section instances 180A–180D may be included in the same or a different survey instance 150.

In this example, each of section instances 180A–180D is associated with an instance of question group (i.e., question groups 182A–182D, respectively). Attribute 216 of question group 106 is assigned an identifier value in each of question groups 182A–182D. In the example of FIG. 1B, identifier values for question groups 182A–182D are "$QC_1$," "$QC_2$," "$QC_3$" and "$QC_4$," respectively. A different value is used to uniquely identify each instance.

Question groups 182A–182D are reusable such that questions 184A–184D within each have the same identifier. As a member of a reusable component of a survey, questions 184A–184D have the same identifier (i.e., "Q1").

Answers 186A–186D are instances of answer 110 that represent answers to questions 184A–184D, respectively. An identifier is assigned to each of answers 186A–186D (i.e., "$A_1$," "$A_2$," "$A_3$" and "$A_4$").

It is possible to retrieve answers associated with questions 184A–184D using the same identifier. That is, it is possible to find all answers to a question whose identifier is equal to "$Q_1$." If each of questions 184A–184D had different identifiers, it would be necessary to identify the value of each identifier prior to retrieving the answers associated with each question.

In one or more embodiments, answer 110 may be be repeatable. Attribute 230 of question 108 identifies an answer as being repeatable.

Process Overview

Figure 10:
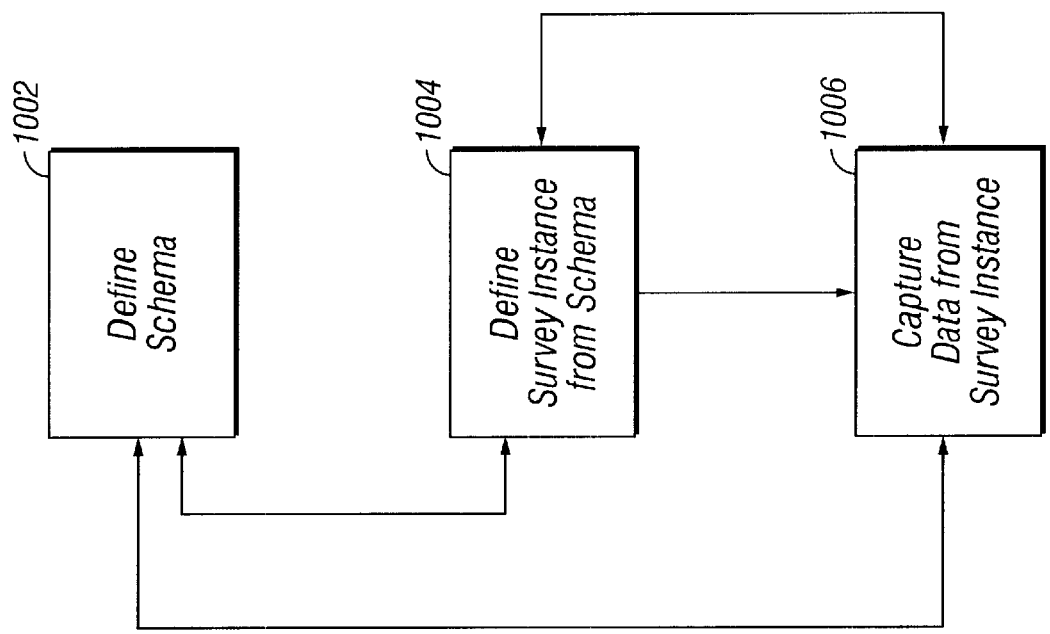
FIG. 10 illustrates a survey definition and generation process flow according to one or more embodiments of the invention.

In one or more embodiments of the invention, schema 160 is used to create multiple survey instances 150. FIG. 10 illustrates a survey definition and generation process flow according to one or more embodiments of the invention.

At block 1002, survey schema 160 is defined. For example, elements of survey schema 160 may be added, deleted or modified. Instances of section 102, question group 106, question 108, answer 110, data object 122, and choice group 112 may be added, deleted or modified, for example. Relationships between elements of survey schema 160 may be added, deleted or modified. For example, an instance of question 108 may be added to or removed from a question group 106. Similarly, a question group 106 may be added to or removed from a section 102. An insert 104 may be added to or removed from a section 102. A choice item 114 may be added to or removed from a choice group 112, and a choice group 112 may be added to or removed from a question 108.

In one or more embodiments of the invention, a new answer type may be added to schema 160. Each answer type has an associated value (e.g., a numeric value). Question 108 and answer 110 include an attribute (e.g., "Answertype," attributes 222 and 260, respectively) that identify the answer type associated with each. In an embodiment of the invention, an answer type associated with question 108 or answer 110 may be changed by modifying an attribute of question 108 or answer 110. Similarly, a data object 122 (e.g., person 128, alias 126 and location 124) that is associated with question 108 or answer 110 may be changed by modifying attribute values (e.g., attributes 228 and 262, respectively).

At block 1004, a survey instance 150 may be defined using a survey schema 160 defined in block 1004. A survey instance 150 may comprise none or more instances of section 102, question group 106, question 108, choice group 112, insert 104, answer 110, choice item 114, etc. It is possible, in one or more embodiments of the invention, to define survey schema 160 and survey instance 150 simultaneously. For example, it is possible to define an element of schema 160 (e.g., using step 1102) for use in a survey instance 150 at step 1004. A survey designer may make use of the elements of survey schema 160 to define a survey instance 150 as well as define additional elements of survey schema 160.

In one or more embodiments of the invention, a change to an element of survey schema 160 is reflected in a survey instance 150 that includes the element. For example, if an instance of question 108 is modified in survey schema 160 (e.g., the text of an instance of question 108 or the answer is changed), the modification is reflected in a survey instance 150 that includes that instance of question 108. The propagation of a modification in survey schema 160 to a survey instance 150 may be avoided, for example, making modifications to an element (new or existing) that is not included in the survey instance 150. A new element may be created with or without the use of an existing element (or elements) as a template.

At block 1006, data may be captured in elements of survey schema 160 for a survey instance 150. For example, data is captured using instances of answer 110, answertext 120, insert 104 and data object 122. In one or more embodiments of the invention, answer text may be stored in attribute 266 of answer 110 and/or attribute 292 of answertext 120. An association between answer 110 and answertext 120 may be formed by storing an identifier of answer 110 in attribute 290 of answer 120.

In one or more embodiments of the invention, a data object 122 may be used to store all or a portion of an answer. If, for example, the answer is of type person, a person 128 instance may be created and the attributes are populated with the person's information. In one or more embodiments of the invention, a relationship is created between an answer 110 and the person 128 instance by storing the identifier of the person 128 instance in attribute 264 of answer 110.

In one or more embodiments of the invention, one data object 122 may be related to another data object 122 as part of an answer. For example, alias 126 may be related to person 128 and store alias information (e.g., a nickname or other name) associated with a person.

Insert 104 may be used to group answers to questions. For example, a participant may provide more than one set of answers to questions in an instance of section 102. Each set of answers may be associated with an instance of insert 104.

Survey Example

In one or more embodiments of the invention, a graphical user interface is used to define schema 160, define survey instance 150 and capture data from a survey instance 150 (e.g., to perform steps 1002, 1004 and 1006 of FIG. 10).
Survey Data Capture GUI FIG. 11 provides an example of a GUI illustrating a portion of a survey instance 150 that may be used to capture data according to an embodiment of the invention. It should be apparent that embodiments of the invention are not limited to the survey example of FIG. 11.

In the example of FIG. 11, window 1102 depicts a portion of a survey instance 150 used to capture holocaust survivor information. Each survivor (i.e., survey participant) is asked for biographical information including general information in addition to prewar, wartime and post-wartime experiences. Data may be entered using window 1102 from a printed version of a survey instance 150, or directly by a participant, for example. Area 1104 provides a list of sections 102 of the survey instance 150. According to one or more embodiments of the invention, a user enters survey data by selecting, or opening, sections (e.g., sections 1106 and 1108) in area 1104.

Section 1108 is opened which indicates that it has been selected while sections 1106 are closed or collapsed in this example. In one or more embodiments of the invention, display 1110 identifies instances of question group 106 of an open instance of section 102 (e.g., section 1108) is displayed. An instance of question group 106 in display 1110 may be selected such as question group selection 1112 which is shaded to indicate that it has been selected. Instances of question 108 that are associated with question group selection 1112 are displayed in area 1114 of window 1102.

Area 1114 comprises columns 1116, 1118 and 1120. In this embodiment of the invention, answer type may also be displayed as a further prompt to the user. For example, entry 1130A indicates that the answer that is expected is a boolean answer (e.g., "yes" or "no"). Entry 1130B indicates that a plain text answer is expected for the question. Entries 1130C and 1130D indicate that instances of data object 122 (i.e., location 124 and person 128) are the expected type for these questions.

Answer text is displayed in columns 1118 and 1120. Instances of choice item 114 may be displayed in area 1122. Thus, for example, when an instance of question 108 displayed in column 1116 is selected, instances of choice item 114 that are associated with the selected instance of question 108 are displayed in area 1122.

Area 1124 may be used to display possible answer selections associated with a question that is displayed in area 1114. For example, entry 1130D expects an instance of person 128 as an answer. Column 1126 may be used to display existing instances of person 128 that may be selected as an answer. Column 1128 of area 1124 may also be used to enter a proposed answer to a question. The proposed answer is retained, subsequently reviewed, and either accepted, or rejected. If accepted, the proposed answer becomes an answer to the question and may become a selectable answer to another question. If rejected, a proposed answer is removed, and another answer may be provided.
Survey Definition GUI FIG. 3 illustrates an example of a window in a GUI used to modify instances of section 102 that comprise a survey instance 150 according to an embodiment of the invention. In display 302, a window is shown which is comprised of instances of section 102, question group 106 and question 108.

Panel 304 displays instances of section 102 (sections 306 and 308) within an instance of form 150. Sections 306 are collapsed such that instances of question group 106 are not displayed. Section 308 is expanded to display instances of question group 106 within section 308 (e.g., question groups 310 and 312). Question group 312 is selected in panel 304 such that instances of question 108 are displayed in panel 316 and the name (i.e., section name attribute 280) is displayed in panel 314.

Panel 316 displays attribute values associated with instances of question 108. Column 320 of panel 316 identifies the question text (i.e., attribute 226) of five instances associated with question 108. Column 318 of panel 316 identifies answer types (e.g., retained in attribute 222) associated with each question. Columns 322, 326 and 328 display values for attributes 284, 228 and 230 of question 108, respectively. Column 324 displays the name of an instance of choice group 112 that groups choices, or answer selections, for a question.

Figure 4A:
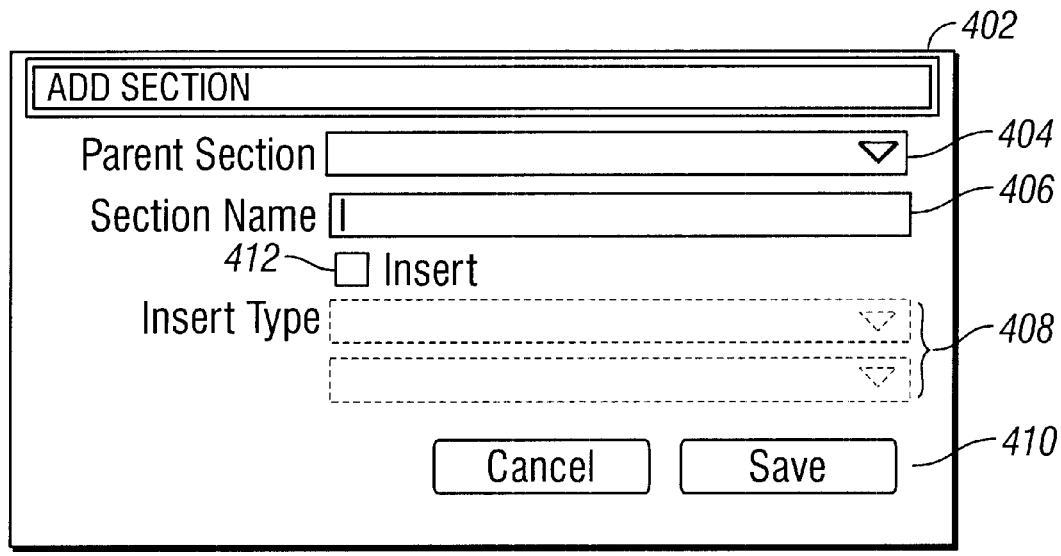
FIGS. 4A–4B illustrate add section and question panels according to an embodiment of the invention.
Figure 4B:
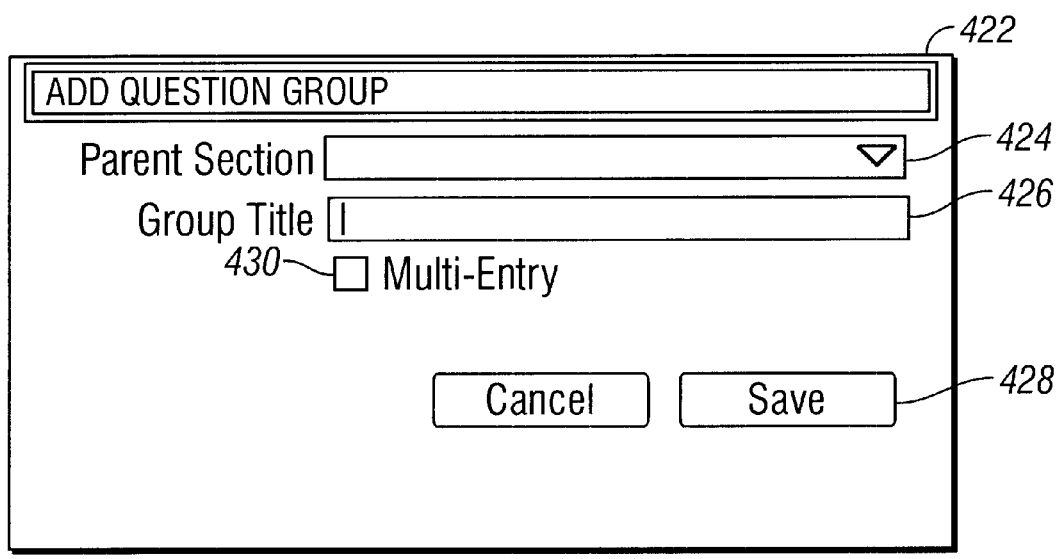

Using buttons 330, 332, 334 and 336, a survey developer may add a section, delete a section, add a question, delete a question respectively. FIGS. 4A–4B illustrate add section and question panels according to an embodiment of the invention.

Referring to FIG. 4A, panel 402 may be used, in one or more embodiments of the invention, to add a section (i.e., to survey schema 160 and/or survey instance 150). Pull down menu area 404 is used to display instances of section 102 to select a parent section where the new instance of section 102 is a subsection of another instance of section 102. Text field 406 may be used to enter a name (e.g., attribute 280) of the new instance of section 102. Check box 412 may be selected to specify whether an instance of insert 104 is associated with an instance of section 102. Pull down menus 408 may be used to display instances of insert 104 to identify types of inserts that are allowed. The save button 410 is used to save the new instance of section 102 in survey schema 160.

A new instance of question group 106 may be added, in one or more embodiments of the invention, using panel 422 of FIG. 4B. Pull down menu 424 displays instances of section 102 to select a section 102 that includes an instance of question group 106 as a member. Text field 426 may be used to enter a title for an instance of question group 106. Check box 430 identifies the instance of question group 422 as a reusable question group (i.e., set attribute 286 of question group 106). Save button 428 commits the new instance to survey schema 160 as an instance of question group 106.

Figure 5:
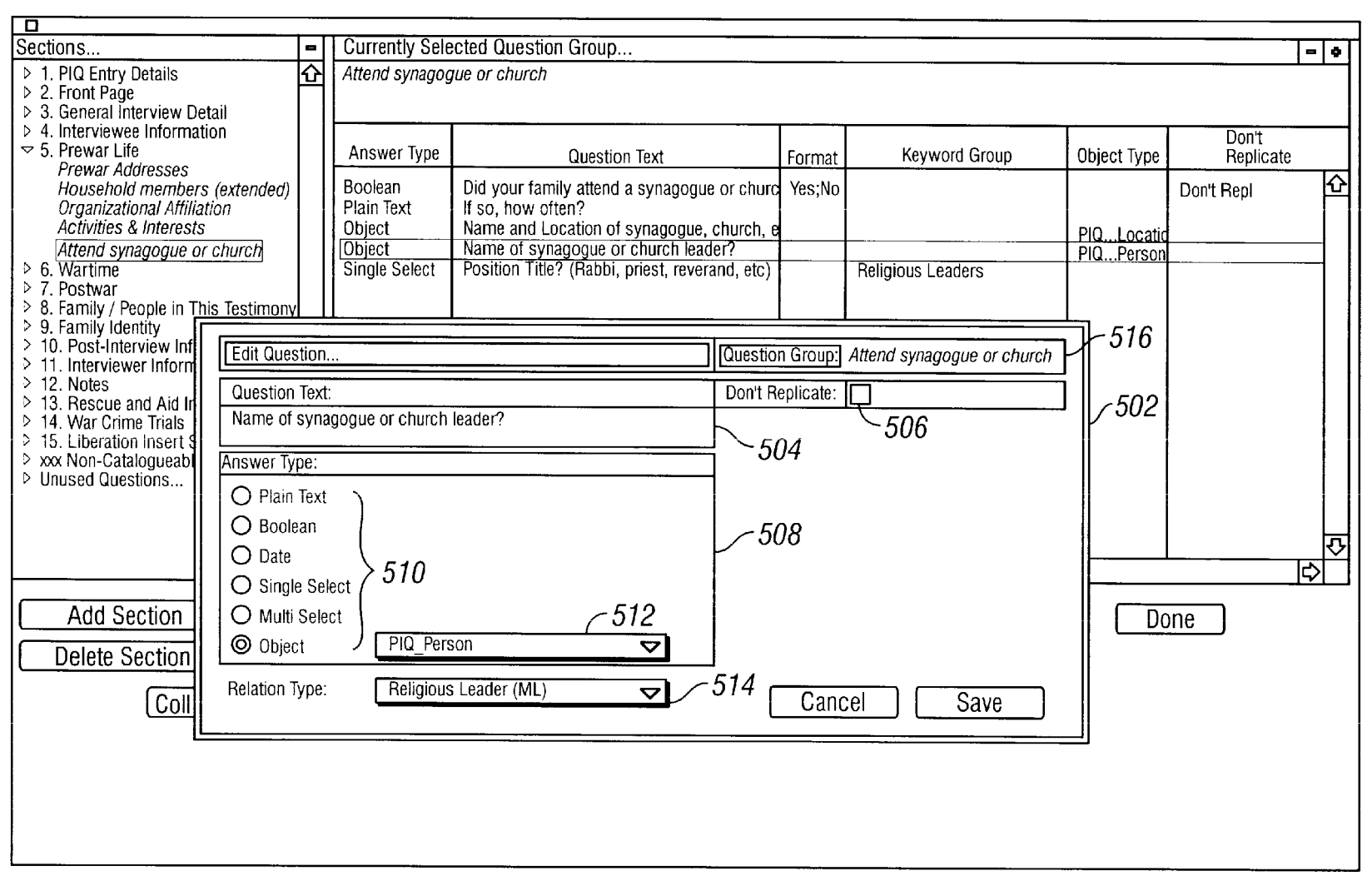

Instances of question 108 may be added, modified or deleted from survey schema 160 or a survey instance 150. FIG. 5 provides an example of a display (i.e., panel 502) that is used to edit an instance of question 108 according to an embodiment of the invention. Fields 516 and 504 identify the name associated with an instance of question group 106 and the text of the question associated with an instance of question 108, respectively. An answer type may be selected from answer type selections 510. Where the answer type is an object, pull down menu 512 may be used to display instances of object 122 for selection. Pull down menu 514 may be used to display instances of choice group 112 to associate answer choices to an instance of question 108.

Figure 6:
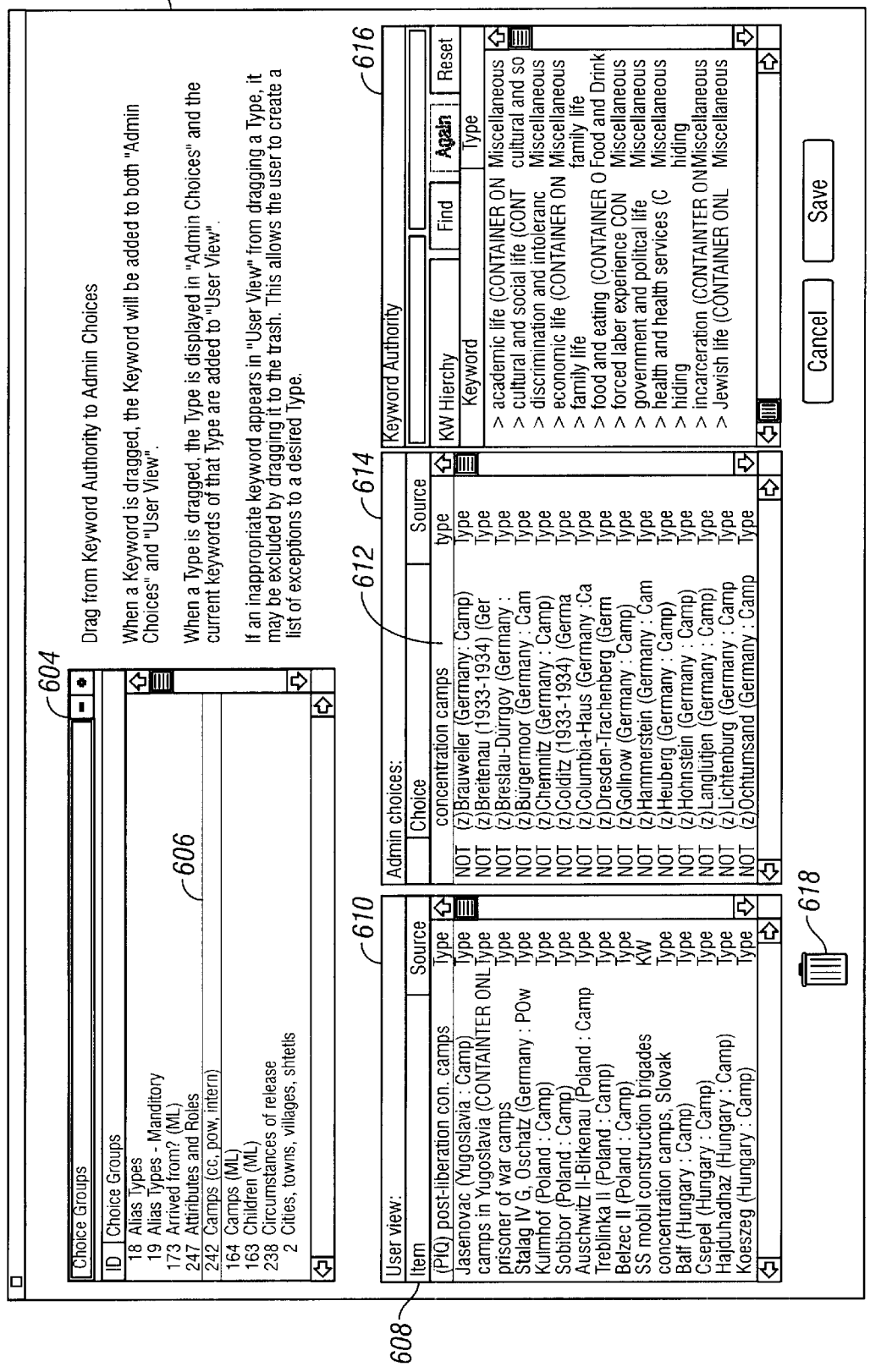
FIG. 6 illustrates a graphical user interface used to edit an instance of choice group according to one or more embodiments of the invention.

FIG. 6 illustrates a user interface used to edit an instance of choice group 112 according to one or more embodiments of the invention. Display 602 includes a listing, in panel 604, of instances of choice group 112. Selecting one of the entries in panel 604 causes information associated with the selected instance of choice group 112 to be displayed in panels 610 and 614. Panel 616 displays instances of type 118 and keyword 116 for selection.

Panel 610 identifies instances of choice item 114. A choice or class of choices may be dragged from panel 616 to panel 614. A choice (e.g., an instance of keyword 116) that is dragged from panel 616 to panel 614 is displayed in panels 614 and 610. A class of choices (e.g., type 118) is displayed in panel 614 and the choices within the class are displayed in panel 610. None or more of the choices within a class of choices may be excluded from the choices by dragging the choice from panel 610 to trash 618.

Entry 608 in panel 610 indicates that the instance of choice item 114 derives from a class of choices. Entry 612 of panel 614 identifies a class of choices (i.e., "concentration camps").

Figure 7:
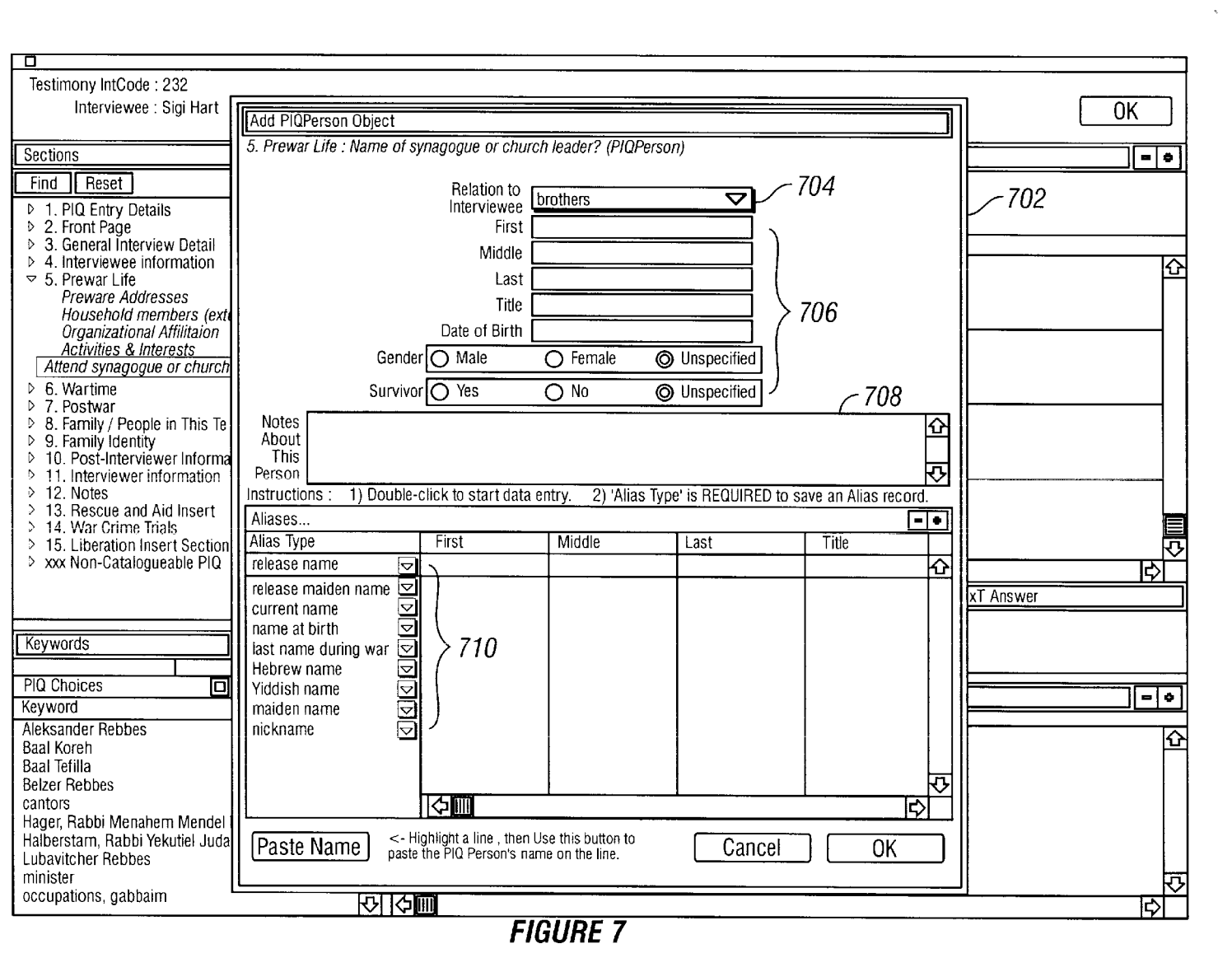
Figure 9:
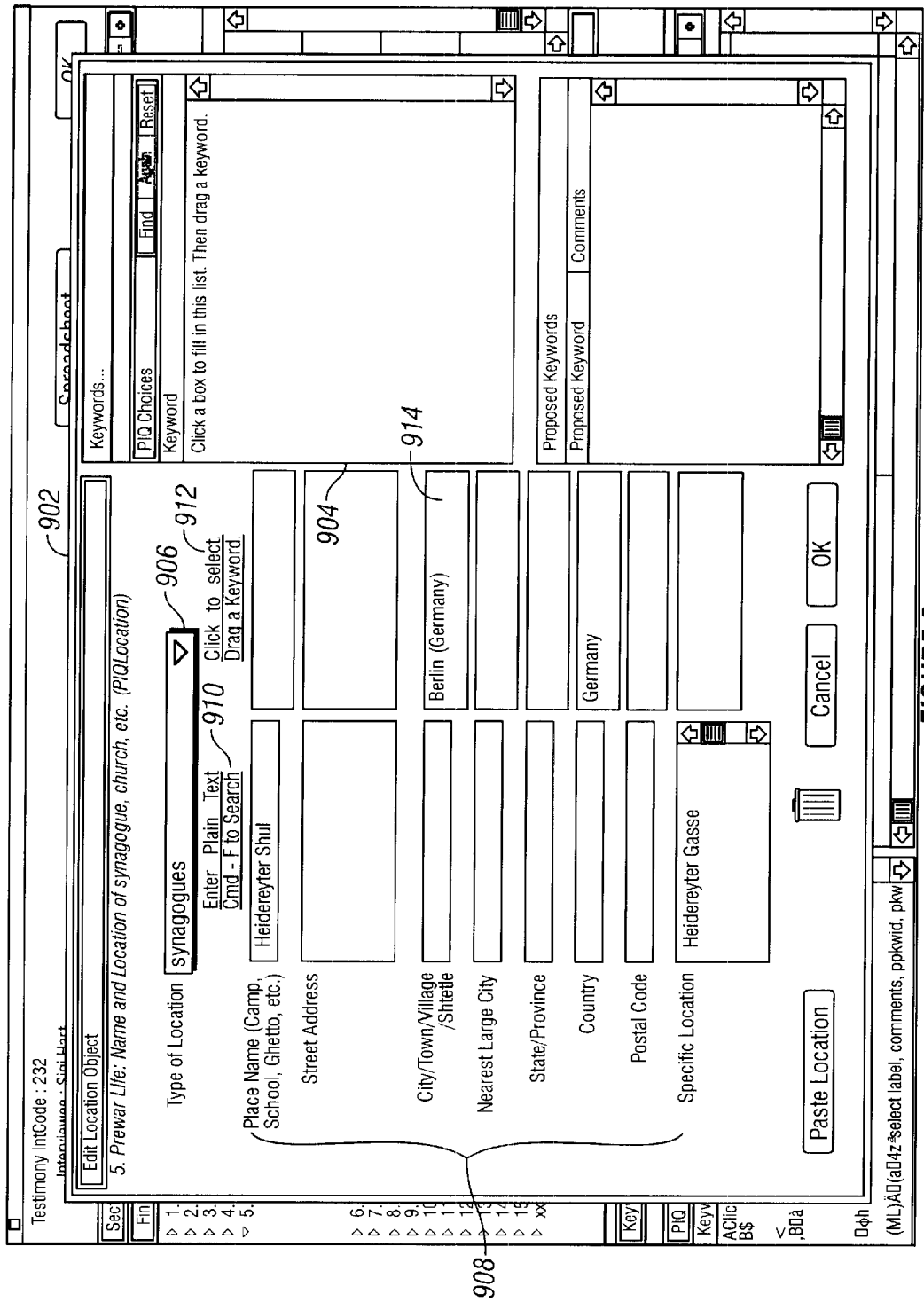

In one or more embodiments of the invention, an answer to a question may comprise a single answer or multiple answers. Answer 110 includes an attribute (e.g., attribute 266, "answertext") that may store a single answer such as a date, a boolean (e.g., "yes" or "no"), currency and text. Alternatively, answer 110 may contain a pointer to an instance of object 122 that comprises one or more attributes that contain the answer. Examples of object 122 include a person object, alias object and location object. FIGS. 7, 8 and 9 provide examples of a GUI for entering object information such as person, alias and location objects according to an embodiment of the invention.

Referring to FIG. 7, panel 702 may be used, in one or more embodiments of the invention, to enter information about a person. Pull down menu 704 is used to display and identify a relationship between the person surveyed and the person that is a part of the answer. Fields 706 are used to enter information related to the person answer. Text field 708 may be used to enter a note about the person. Pull down menus 710 may be used to identify an alias associated with the person answer (e.g., a name to which the person is also known).

FIG. 8 provides an example of a panel 802 that may be used to enter alias object information. Pull down menu 804 may be used to display and identify another survey element (e.g., person object) for which the alias object is an alias. Fields 806 identify the alias name, title, etc. Pull down menu 808 is used to display and select an alias type. Text field 810 may be used to input additional notes.

In an embodiment of the invention, if an answer to a question is a location, a location object is used. FIG. 9 provides a display of a panel 902 that may be used to specify a location answer according to one or more embodiments of the invention.

Pull down menu 906 is used to display and select a location type. Fields 908 are used to enter information associated with the attributes of a location object. Column 910 is used to receive a text entry. Column 912 may be used to display a selection made from class items associated with a given attribute. Panel 904 may be used to display choices for one of the fields in column 912 that has been selected. A choice is selected, in one or more embodiments of the invention, by dragging it from panel 904 to the selected field (e.g., field 914).

Catalogue

In one or more embodiments of the invention, catalogue 1304 used in one or more embodiments of the invention comprises catalogue elements. As discussed above, one catalogue element, a phrase (e.g., phrase 1502 or phrase 1906 of FIGS. 19A–19C), may be associated with a portion of multimedia data 1306. A phrase has a plurality of attributes some of which are attribute elements. The attribute elements that are attributes of a phrase include keyword, person, image, video (e.g., documentary footage), proposed person, and proposed keyword. The keyword, person, image, proposed person and proposed keyword attribute elements can have attributes that are also attribute elements. For example, attribute elements that are attributes of the keyword attribute element include thesaural keyword, thesaural person, keyword, and type. An index is built on the attributes and attribute elements. The index can be used to navigate through the catalogue (e.g., search for phrases).

Figure 19A:
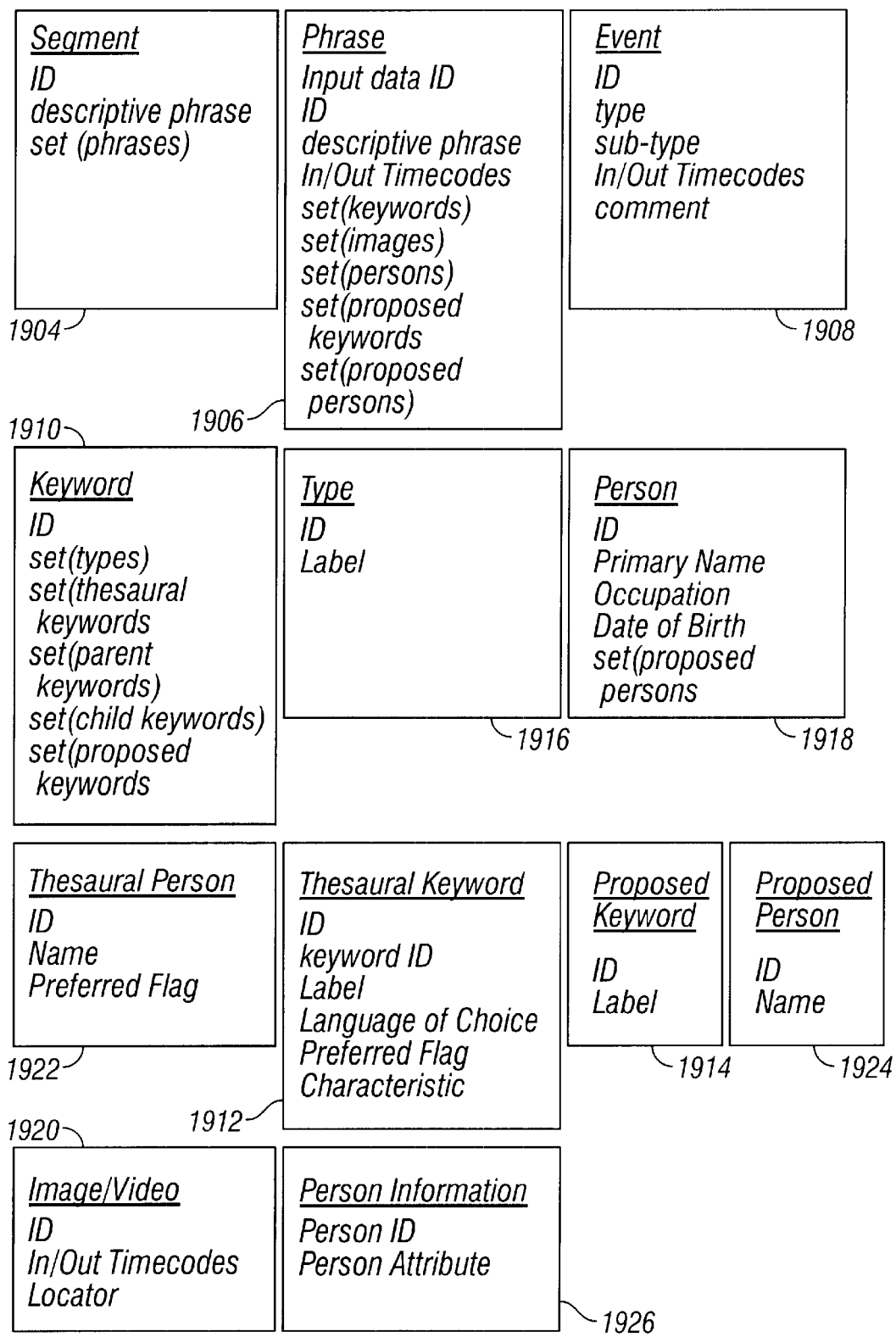
FIG. 19A provides an example of catalogue and attribute elements and their attributes according to an embodiment of the invention.

FIG. 19A provides an example of catalogue and attribute elements and their attributes according to an embodiment of the invention. Segment 1904 (also referred to herein as segment 1408) is a container element. It can contain other elements. For example, segment 1904 can contain one or more instances of phrase 1906. In the invention, input data is decomposed into one or more pieces, or fragments. An instance of phrase 1906 is associated with each input data fragment. Phrase 1906 is a catalogue element. Phrase 1906 has one or more attributes and/or attribute elements on which an index is built. The index can be used to navigate through the catalogue.

An attribute of phrase 1906 is keyword 1910 (also referred to herein as keyword 1406). An instance of phrase 1906 can be associated with one or more instances of keyword 1910. Keyword 1910 further defines aspects of an input data fragment. Preferably, an attribute of keyword 1910 identifies content, or substance, for an input data fragment. The content or substance identified by keyword 1910 is preferably expressed as a single word. However, content or substance can be expressed using multiple words.

To illustrate, the input data can be a videotape. The videotape is, for example, that of an interview, or survey, conducted with a survivor of the Holocaust. The interview is broken down into the interviewee's pre-war, war-time, and post-war experiences. The interviewee's pre-war experience can be broken down into topics (e.g., each of which may be instantiated as a section 126). A pre-war topic might be the interviewee's personal life, for example. Each topic can be broken down into sub-topics (each of which may be instantiated as subsections, or instances of section 126). In the example of the interviewee's personal life, a sub-topic might be the interviewee's relationship with family members, experiences at school, etc. Each sub-topic contains an information item. To further illustrate using the current example, an information item might be home, brother, sister, teacher, etc. In this example, the topic of the interviewee's personal life becomes an instance of segment 1904. The interviewee's relationship with family members and experiences at school become instances of phrase 1906. The words home, brother, sister, and teacher become instances of keyword 1910. The words home, brother, sister and teacher provide information regarding the content or substance of an input data fragment.

An instance of keyword 1910 can be associated with one or more instances of thesaural keyword 1912. An instance of thesaural keyword 1912 is an instantiation of an instance of keyword 1910. Thesaural keyword 1912 specifies a value or label for its associated instance of keyword 1910. Thesaural keyword 1912 can be one or more words. Thesaural keyword 1912 can be used, for example, to specify a value for an instance of keyword 1910 in a particular language. Multiple instances of thesaural keyword 1912 can be used to express the value of an instance of keyword 1910 in multiple languages. Alternative expressions for the value of an instance of keyword 1910 can be retained by instances of thesaural keyword 1912 as well. Thus, the content or substance of an input data fragment can be expressed in multiple languages with a plurality of alternative expressions in each language. A preference can be associated with an instance of thesaural keyword 1912 to identify it as a preferred alternative in a given language.

Figure 19B:
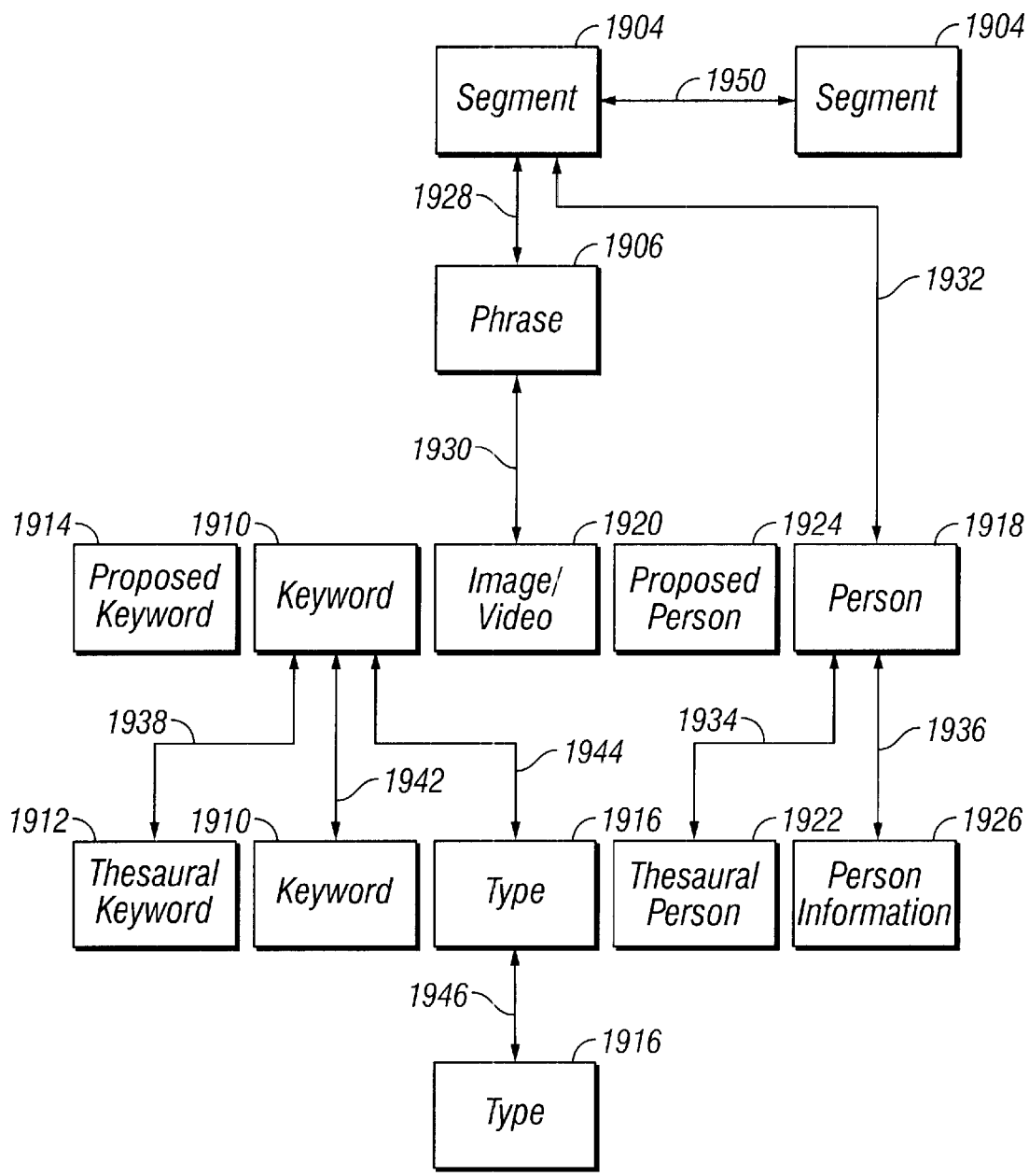
FIG. 19B illustrates relationships formed between the elements identified in FIG. 19A according to an embodiment of the invention.
Figure 19C:
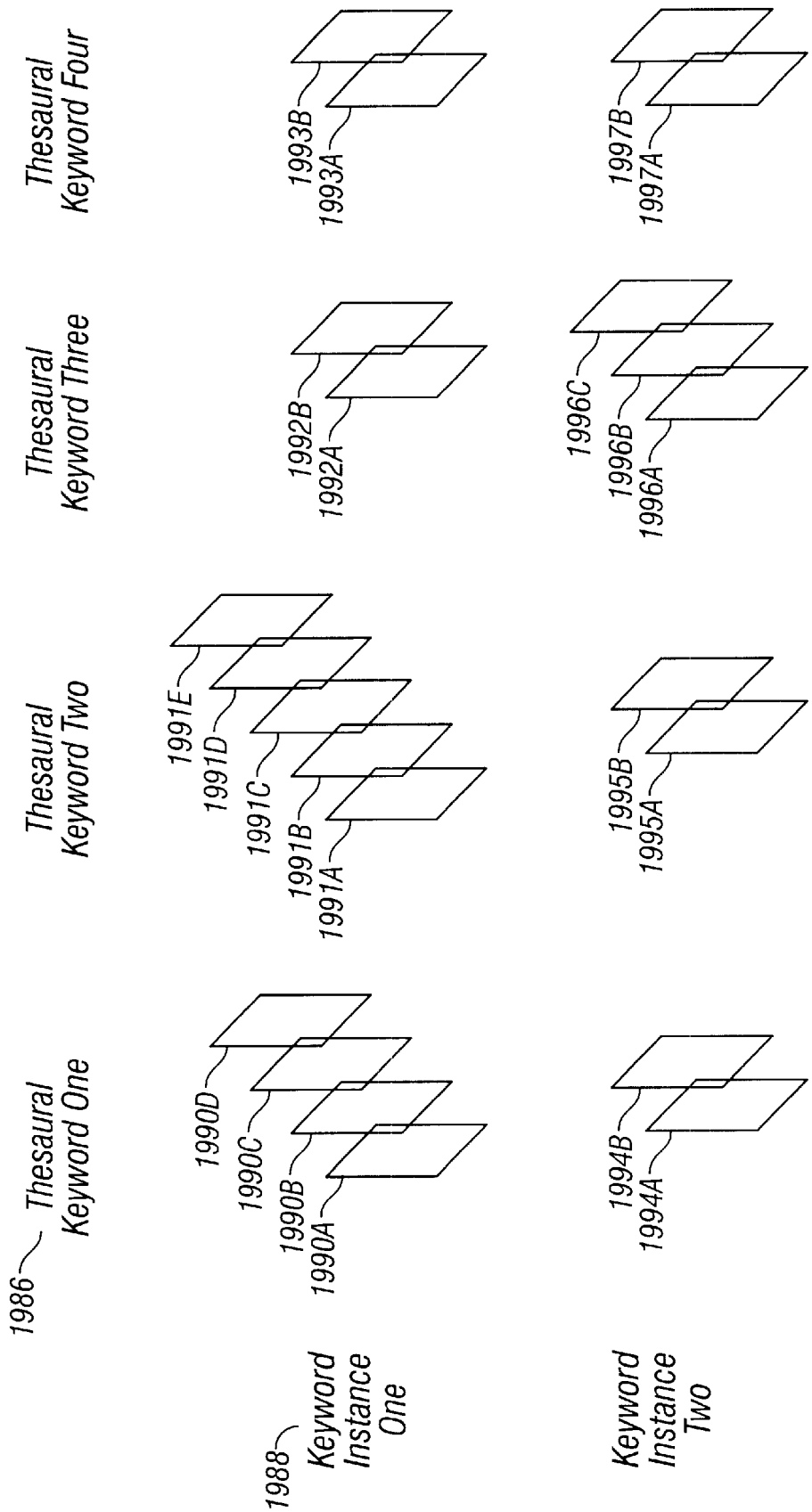
FIG. 19C provides an illustration of instances of keyword 1910 and a plurality of associated label attributes according to an embodiment of the invention.

FIG. 19C provides an illustration of instances of keyword 1910 and a plurality of associated label attributes- according to an embodiment of the invention. A grid is displayed with axes 1986 and 1988. Instances of keyword 1910 are displayed along a vertical axis, axis 1986. A horizontal axis, axis 1986 contains examples of languages in which a label associated to an instance of keyword 1910 can be represented. Instances of thesaural keyword 1912 are depicted at the intersections of these two axes.

Each instance of thesaural keyword 1912 is an instantiation for an associated instance of keyword 1910. Each instance of thesaural keyword 1912 contains a label that can be used as the label for an instance of keyword 1910. For example, thesaural keywords 1990A–1990D, 1991A–1991E, 1992A–1992B, and 1993A–1993B are instantiations of Keyword Instance One. Similarly, thesaural keywords 1994A–1994B, 1995A–1995B, 1996A–1996C, 1997A–1997B are instantiations of Keyword Instance Two.

An instance of thesaural keyword 1912 can be an instantiation of an instance of keyword 1910 in a particular language. For example, thesaural keywords 1991A–1991E are English instantiations of Keyword Instance One. Thesaural keywords 1991A–1991E provide alternate instantiations for Keyword Instance One. That is, each contains a English-language label for Keyword Instance One. Thus, Keyword Instance One can be associated with a different English-language label based on which instance of thesaural keywords 1991A–1991E is used to supply the label for Keyword Instance One. Similarly, Keyword Instance is associated with English-language alternatives contained in thesaural keywords 1995A–1995B.

Thus, within a language, an instance of keyword 1910 can have alternate instantiations of thesaural keyword 1912. An instance of keyword 1910 can also have alternate instantiations of thesaural keyword 1912 across multiple languages as exemplified in FIG. 19C. Alternate instantiations for Keyword Instance One exist in French (e.g., thesaural keywords 1990A–1990D), German (e.g., thesaural keywords 1992A–1992B), and Russian (e.g., thesaural keywords 1993A–1993B), for example. Similarly, Keyword Instance Two has alternative instantiations in French (e.g., thesaural keywords 1994A–1994B), German (e.g., thesaural keywords 1994A–1994C), Russian (e.g., thesaural keywords 1997A–1997B).

A preferred alternate instantiation of an instance of keyword 1910 can be identified in each of the languages in which the keyword instance is represented. Thus, for example, thesaural keyword instance 1990C can be identified as the preferred instantiation of Keyword Instance One for the French language. Similarly, thesaural keyword instances 1991B, 1992A, and 1993B can be the preferred English, German, and Russian (respectively) instantiations for Keyword Instance One. Thesaural keyword instances 1994A, 1995B, 1996C, and 1997A can be the preferred French, English, German, and Russian instances (respectively) for Keyword Instance Two.

Referring to FIG. 19A, type 1916 (also referred to herein as type 1504) is associated with keyword 1910. Type 1916 provides attribute information for keyword 1910. Type 1916 can be used to include instances of keyword 1910 in a classification or category. In other words, an instance of keyword 1910 is an instantiation of an instance of type 1916. For example, an instance of keyword 1910 having an attribute of "Ford Bronco" could be associated with a type instance having an attribute of "car". Another instance of keyword 1910 having an attribute of "Mustang" can also be associated with the same instance of type 1916. Both instances of keyword 1910 are instances of a car. One or more instances of type 1916 can be associated with an instance of keyword 1910. In the preferred embodiment, a hierarchy is established for instances of type 1916. An instance of type 1916 can be a parent to or a child of another other instances of type 1916. An instance of keyword 1919 that is associated with an instance of type 1916 is also associated with the hierarchy of the instance of type 1916.

Other attribute elements that can be associated with an input data fragment via phrase 1906 include person 1918, and image 1920. Person 1918 identifies an individual associated with an input data fragment. In the previous example, a personal life experience may contain a reference to a person. An instance of person 1918 can be used to identify the reference. Person information 1926 provides attribute information for an instance of person 1918. An instance of image 1920 is used for data such as a still photograph that is referenced in the input data.

In the preferred embodiment of the invention, some elements, such as keyword 1910 and person 1918, must be approved before becoming actual instances. Prior to approval, the instances are considered to be proposed instances. For example, proposed keyword 1914 and proposed person 1924 are attribute elements used to identify instances of keyword 1910 and person 1918 that have not yet been approved as actual instances. Proposed instances are reviewed and a determination is made whether to transform the proposed attribute element into an actual attribute element or to otherwise dispose of the proposed attribute element.

Person Information 1926 is an attribute element associated with person 1918. A "one-to-one" relationship (relationship 1936) exists between person information 1926 and person 1918. Person information 1926 contains attributes for person 1918. The attributes of person information 1926 contain information for a person having an instance of person 1918.

Events can also be associated with input data. Each event becomes an instance of event 1908. As previously described, input data can be decomposed into input data fragments each of which is associated with an instance of phrase 1906. Input data can also be decomposed into input data fragments that are associated with instances of event 1908. A type attribute is associated with event 1908. Examples of an event type in the preferred embodiment include a segment, phrase, break between tapes, quality assurance details, facts, and miscellaneous (or other). An event can be used to access the associated input data fragment. An instance of event 1908 can be used to access an input data fragment. For example, an instance of event 1908 of type phrase can be used to locate the input data fragment associated with an instance of phrase 1906.

Another example of an event type is a quality assurance event. In the preferred embodiment of the invention, a quality assurance mechanism can be used to monitor the quality of the input data and provide feedback. Quality assurance events are used to mark the input data. An event can mark a positive, negative, or neutral quality assurance event. For example, video input data is being collected in multiple interviews. Each interview can be reviewed to identify parts of the interview process that are noteworthy. Where, for example, an interviewer does not follow-up with an interviewee to obtain additional details, a negative quality assurance event can be created. A positive event can be similarly created. An event that is neither positive nor negative (i.e., informational or neutral) can also be created. A report of quality assurance events can be generated and used to provide feedback to the persons involved in collecting the input data.

Relationships of Elements

In the preferred embodiment, catalogue and attribute elements are interrelated. Relationships are formed between two or more elements using the invention. FIG. 19B illustrates relationships formed between the elements identified in FIG. 19A according to an embodiment of the invention. A "many" relationship is signified using a double arrow. A "one" relationship is identified using a single arrow. Relationship 1928, for example, is a "many-to-many" relationship. That is, one or more instances of segment 1904 can be related to many instances of phrase 1906. Alternatively stated, segment 1904 contains one or more instances of phrase 1906. One instance of phrase 1906 can be related to multiple instances of segment 1904. That is, an instance of phrase 1906 is contained within one or more instances of segment 1904. As illustrated by relationship 1946, one or more instances of type 1916 can be related to other instances of type 1916.

A "many-to-many" relationship (relationship 1930) exists between phrase 1906 and proposed keyword 1914, keyword 1910, image/video 1920, proposed person 1924 and person 1918. An instance of phrase 1906 can be related to a set of proposed keywords, a set of keywords, a set of images and/or video, a set of proposed persons, and a set of persons, each set having zero or more members. Further, an instance of proposed keyword 1914, keyword 1910, image 1920, proposed person 1924 or person 1918 can be related to more than one instance of phrase 1906.

Relationship 1938 illustrates a "many-to-many" relationship between keyword 1910 and thesaural keyword 1912. An instance of keyword 1910 can be associated with one or more instances of thesaural keyword 1912. The same instance of thesaural keyword 1912 can be associated with one or more instances of keyword 1910.

As previously stated, instances of type 1916 can be interrelated with other instances of type 1916 via a type hierarchy. Relationship 1944 identifies an instance of type 1916 as a parent or child of another instance of type 1916. Similarly, the instances of keyword 1910 are interrelated via a keyword hierarchy. Keyword 1910 can be related to other instances of keyword 1910 via relationship 1942. Relationship 1942 identifies an instance of keyword 1910 as a parent or child of another instance of keyword 1910. Relationship 1944 relates keyword 1910 and type 1916. That is, one instance of keyword 1910 is related to an instance of type 1916. Conversely, an instance of type 1916 can be associated with multiple instances of keyword 1910.

Further, an instance of keyword 1910 can be related to many instances of type 1916 via relationships 1942 and 1946. That is, an instance of keyword 1910 has a type that is associated with an instance of type 1916. In addition, the instance of keyword 1910 inherits the types associated with the children of its associated instance of type 1916.

Person 1918 and person information 1926 have a "one-to-one" relationship via relationship 1928. Person 1918 and thesaural person 1922 are related via relationship 1934. Person 1918 can be associated with multiple instances of thesaural person 1922. An instance of thesaural person 1922 can be related to multiple instances of person 1918 via relationship 1934.

Segment 1904 is a container element. That is, as illustrated by relationship 1928, segment 1904 can contain multiple instances of phrase 1906. Segment 1904 is defined by the set of elements that it contains. For example, segment 1904 is, for example, a chapter segment, a testimony segment, or a general segment. Instances of phrase 1906 can be grouped in the order in which they occur in the input data in a chapter segment. As a testimony segment, segment 1904 contains a grouping of instances of 1904 associated with the input data. For example, a testimony segment can contain all instances of segment 1904 that are associated with a videotaped interview. Person 1918 can be related to segment 1904 via relationship 1932. At least one instance of person 1918 is related to an instance of segment 1904 that is a testimony segment via relationship 1932.

Relationship 1950 illustrates the relationship between instances of segment 1904 (i.e., a testimony segment) that act as a container for other instances of segment 1904. A general segment contains a set of instances of phrase 1906 that are not necessarily related to particular input data. A general segment can be a collection of phrases that meet a certain criteria. For example, a general segment can contain instances of phrase 1906 that are related to an instance of keyword 1910 having a value of "teacher".

Segment 1904 therefore identifies a group of catalogue elements (e.g., phrase 1906. An instance of segment 1904 can identify all catalogue element instances. Other instances of segment 1904 can identify a subset of catalogue elements. Thus, for example, an instance of segment 1904 can identify all instances of phrase 1906 or a subset of all of the instances of phrase 1906. The set including all instances of phrase 1906 is a catalogue. A smaller catalogues that contain a subset of all instances of phrase 1906 is also a catalogue. Within a catalogue, a smaller catalogue can be created by, for example, a query operation or user designation.

A set of catalogue elements can be identified by querying the attribute elements, for example. A query operation can be performed on the attribute elements to examine other attribute elements associated with a catalogue element. A query operation identifies a set of cataloguing elements (e.g., instances of phrase 1906) that satisfy the criteria specified in the query. A set of cataloguing elements identified in a query are grouped in an instance of segment 1904. A user can also specify a collection of phrases 1906 that can be grouped in an instance of segment 1904.

Attributes

FIG. 19A provides examples of attributes for catalogue and attribute elements according to an embodiment of the invention. Segment 1904 contains an identifier (ID), a descriptive phrase, and a set of phrases, for example. The phrases related to an instance of segment 1904 are included in the segment instance's set of phrases. A set is formed by creating relationships between the elements. FIG. 19B illustrates examples of the relationships that exist between elements in an embodiment of the invention. The relationships that form a set can be implemented using any of the known techniques known in the art. For example, the relationships can be implemented in a programming language using pointers. In a relational database management system, for example, the relationships can be formed using relations and primary and foreign keys.

Referring to FIG. 19A, phrase 1906 includes an input data ID (e.g., identifies the input data from which the phrase was generated), an ID, a descriptive phrase, In/Out timecodes (i.e., a corresponding location within the input data), a set of keywords, images, persons, proposed keywords, and proposed persons. Keyword 1910 includes an ID, and sets of types, thesaural keywords, child keywords and parent keywords. The child and parent keyword set form relationships for the keyword hierarchy. The set of thesaural keywords related to keyword 1910 contain keyword values or labels for keyword instance.

Person 1918 includes an ID, a primary name, an occupation, date of birth, and a set of proposed persons. Person information 1926 contains a person ID for the associated instance of person 1918. Person information 1926 contains one or more attributes for the associated instance of person 1918. The attribute information can vary depending on the multimedia information being catalogued. For example, the catalogued multimedia data may consist of interviews with individuals. An instance of person 1918 can be instantiated and associated with an interviewee. Person information 1926 associated with the instance of person 1918 can then include biographical information of the interviewee. The multimedia data videotaped sporting events. In this case, an instance of person 1918 can be created for a person associated with the sporting event (e.g., player, referee, and broadcasting personnel). An instance of person information 1926 associated with the instance of person 1918 can include statistical information associated with the participant.

An event 1908 includes an ID, type (e.g., segment, phrase, interviewer, videographer, fact, or other), sub-type (e.g., a positive, negative, or informational event), timecodes, and a comment (or descriptive note).

Thesaural keyword 1912 includes an ID, a keyword ID (i.e., the ID for an instance of keyword 1910 for which the thesaural keyword instance is an alternative), a label (i.e., the value of the keyword instance to which the thesaural instance is related), a language of choice identifier (or language ID), a preferred flag, and a characteristic (or class). If set, the preferred flag specifies that the thesaural keyword instance is the preferred alternative for the related keyword instance in the language specified by the language ID. The characteristic attribute further defines the thesaural keyword instance. It can be used to identify that thesaural keyword instance is a slang word, for example.

An ID, timecode and locator are included as attributes for image 1920. The locator attribute is used to locate the digitized image, for example. Proposed keyword 1914 includes an ID and a label. It is also possible to include the attributes contained in keyword 1910 in proposed keyword 1914. Thus, the user that is proposing a new keyword can enter as much information regarding the proposed keyword. Proposed person 1924 includes an ID and name attribute. Like proposed keyword 1914, the attributes associated with person 1918 can be included in proposed person 1924. Type 1916 includes an ID and a label.

Elements and their relationships can be managed using a cataloguing mechanism and a relationship management mechanism. The cataloguing mechanism includes a user interface that includes a series of screens. During cataloguing, a user (e.g., a cataloguer) reviews the input data and causes elements to be instantiated and associated with the input data and other elements. Elements that already exist can be associated with the input data during cataloguing. In addition, a cataloguer can propose new elements and relationships. The relationship management facility is used to review the elements and relationships proposed by a cataloguer. The relationship management facility can also be used to create new elements and relationships.

Embodiment of Computer Execution Environment
(Hardware)

Figure 12:
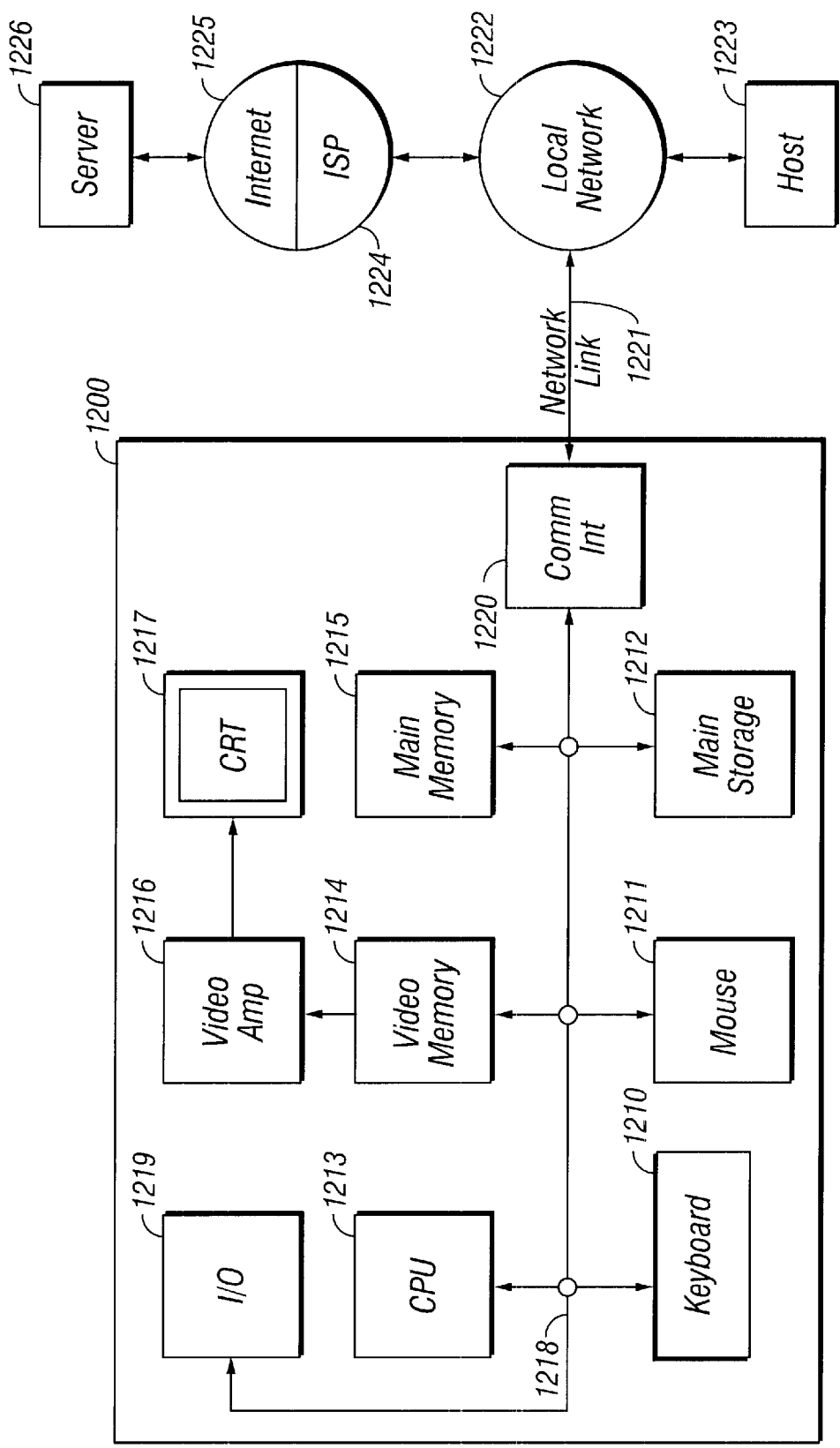
FIG. 12 is a block diagram of one embodiment of a computer system capable of providing a suitable execution environment for an embodiment of the invention.

An embodiment of the invention can be implemented as computer software in the form of computer readable code executed on a general purpose computer such as computer 1200 illustrated in FIG. 12, or in the form of bytecode class files executable within a Java runtime environment running on such a computer. A keyboard 1210 and mouse 1211 are coupled to a bidirectional system bus 1218. The keyboard and mouse are for introducing user input to the computer system and communicating that user input to processor 1213. Other suitable input devices may be used in addition to, or in place of, the mouse 1211 and keyboard 1210. I/O (input/output) unit 1219 coupled to bidirectional system bus 1218 represents such I/O elements as a printer, A/V (audio/video) I/O, etc.

Computer 1200 includes a video memory 1214, main memory 1215 and mass storage 1212, all coupled to bi-directional system bus 1218 along with keyboard 1210, mouse 1211 and processor 1213. The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 also includes, for example, a 32-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the cathode ray tube (CRT) raster monitor 1217. Video amplifier 1216 is well known in the art and may be implemented by any suitable apparatus. This circuitry converts pixel data stored in video memory 1214 to a raster signal suitable for use by monitor 1217. Monitor 1217 is a type of monitor suitable for displaying graphic images. Alternatively, the video memory could be used to drive a flat panel or liquid crystal display (LCD), or any other suitable data presentation device.

Computer 1200 may also include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Communication interface 1220 could also be a cable modem or wireless interface. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to local server computer 1223 or to data equipment operated by an Internet Service Provider (ISP) 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Computer 1200 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220.

The received code may be executed by processor 1213 as it is received, and/or stored in mass storage 1212, or other non-volatile storage for later execution. In this manner, computer 1200 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including embedded devices (e.g., web phones, etc.) and "thin" client processing environments (e.g., network computers (NC's), etc.) that support a virtual machine.

Thus, a method and apparatus for cataloguing multimedia data using surveying data has been described in conjunction with one or more specific embodiments. The invention is defined by the claims and their full scope of equivalents.

What is claimed is:

1. In a computer system, associating multimedia data with surveying data comprising:

obtaining an association between survey data and at least one catalogue element of a catalogue, said at least one catalogue element associated with said multimedia data;

searching said survey data to identify said at least one catalogue element;

identifying said multimedia data using said at least one catalogue element.

2. The surveying method of claim 1 wherein said survey data comprises at least one survey element, said survey element comprises at least one attribute that associates said at least one survey element with said at least one catalogue element.

3. The method of claim 2 wherein said survey data comprises at least one question element.

4. The method of claim 2 wherein said survey data comprises at least one answer element.

5. The method of claim 2 wherein said at least one attribute identifies at least one segment element of said catalogue.

6. The method of claim 1 wherein said catalogue element is a phrase element.

7. The method of claim 1 wherein said catalogue element is a keyword, said identifying said multimedia data further comprises:

identifying at least one phrase associated with said keyword, said at least one phrase being associated with said multimedia data.

8. The method of claim 1 wherein said catalogue element is a type, said identifying said multimedia data further comprises:

identifying at least one keyword associated with said type;

identifying at least one phrase associated with said at least one keyword, said at least one phrase being associated with said multimedia data.

9. The method of claim 1 wherein said catalogue element is a segment, said identifying said multimedia data further comprises:

identifying at least one phrase associated with said segment, said at least one phrase being associated with said multimedia data.

10. A memory for storing survey information accessible by at least one computer program being executed on a machine, said survey information comprising:

a first set of elements stored in said memory, said first set of elements usable to retain survey data;

a second set of elements stored in said memory, said second set of elements being associated with at least one of said first set of elements, said second set of elements usable to retain catalogue data;

multimedia data in said memory, said multimedia data associated with said at least one of said first set of elements using said second set of elements.

11. The memory of claim 10 wherein said first set of elements comprises at least one survey element, said survey element comprises at least one attribute that associates said at least one survey element with said at least one catalogue element.

12. The memory of claim 11 wherein said first set of elements comprises at least one question element.

13. The memory of claim 11 wherein said first set of elements comprises at least one answer element.

14. The memory of claim 11 wherein said at least one attribute identifies at least one) segment element of said second set of elements.

15. The memory of claim 10 wherein said second set of elements comprises a keyword, said second set of elements further comprising:

at least one phrase associated with said keyword, said at least one phrase being associated with said multimedia data.

16. The memory of claim 10 wherein said second set of elements comprises a type element, said memory further comprising:

at least one keyword associated with said type;

at least one phrase associated with said at least one keyword, said at least one phrase being associated with said multimedia data.

17. The memory of claim 10 wherein said second set of elements comprises a segment, said memory further comprising:

at least one phrase associated with said segment, said at least one phrase being associated with said multimedia data.

18. A computer program product comprising:

a computer usable medium having computer readable program code embodied therein configured to associate multimedia data with surveying data comprising:

computer readable program code configured to cause a computer to obtain an association between survey data and at least one catalogue element of a catalogue, said at least one catalogue element associated with said multimedia data;

computer readable program code configured to cause a computer to search said survey data to identify said at least one catalogue element;

computer readable program code configured to cause a computer to identify said multimedia data using said at least one catalogue element.

19. The computer program product of claim 18 wherein said survey data comprises at least one survey element, said survey element comprises at least one attribute that associates said at least one survey element with said at least one catalogue element.

20. The computer program product of claim 19 wherein said survey data comprises at least one question element.

21. The computer program product of claim 19 wherein said survey data comprises at least one answer element.

22. The computer program product of claim 19 wherein said at least one attribute identifies at least one segment element of said catalogue.

23. The computer program product of claim 18 wherein said catalogue element is a phrase element.

24. The computer program product of claim 18 wherein said catalogue element is a keyword, said computer readable program code configured to cause a computer to identify said multimedia data further comprises:

computer readable program code configured to cause a computer to identify at least one phrase associated with said keyword, said at least one phrase being associated with said multimedia data.

25. The computer program product of claim 18 wherein said catalogue element is a type, said computer readable program code configured to cause a computer to identify said multimedia data further comprises:

computer readable program code configured to cause a computer to identify at least one keyword associated with said type;

computer readable program code configured to cause a computer to identify at least one phrase associated with said at least one keyword, said at least one phrase being associated with said multimedia data.

26. The computer program product of claim 18 wherein said catalogue element is a segment, said computer readable program code configured to cause a computer to identify said multimedia data further comprises:

computer readable program code configured to cause a computer to identify at least one phrase associated with said segment, said at least one phrase being associated with said multimedia data.

* * * * *